United States Patent
Bodin et al.

(10) Patent No.: US 7,107,148 B1
(45) Date of Patent: *Sep. 12, 2006

(54) NAVIGATING A UAV WITH ON-BOARD NAVIGATION ALGORITHMS WITH FLIGHT DEPICTION

(75) Inventors: William Kress Bodin, Austin, TX (US); Jesse J. W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 452 days.

This patent is subject to a terminal disclaimer.

(21) Appl. No.: 10/692,128

(22) Filed: Oct. 23, 2003

(51) Int. Cl.
*G01C 21/28* (2006.01)
(52) U.S. Cl. .............. 701/206; 701/3; 701/23; 701/213; 244/75 R
(58) Field of Classification Search .............. 701/1, 701/2, 3, 10, 13, 200–214, 23, 24; 340/974, 340/979; 244/45 R, 75 R, 75.1, 76 R
See application file for complete search history.

(56) References Cited

U.S. PATENT DOCUMENTS

| 5,240,207 | A | | 8/1993 | Eiband et al. |
| 5,552,983 | A | | 9/1996 | Thornbert et al. |
| 5,581,250 | A | | 12/1996 | Khvilivitzky |
| 5,716,032 | A | * | 2/1998 | McIngvale .................. 244/185 |
| 5,890,441 | A | | 4/1999 | Swinson et al. |
| 6,056,237 | A | | 5/2000 | Woodland |
| 6,122,572 | A | * | 9/2000 | Yavnai ......................... 701/23 |
| 6,130,705 | A | | 10/2000 | Lareau et al. |
| 6,219,004 | B1 | | 4/2001 | Johnson |
| 6,377,875 | B1 | | 4/2002 | Schwaerzler |
| 6,498,968 | B1 | | 12/2002 | Bush |
| 6,584,382 | B1 | * | 6/2003 | Karem ........................... 701/3 |
| 6,626,398 | B1 | * | 9/2003 | Cox et al. ................. 244/45 R |
| 6,728,630 | B1 | * | 4/2004 | Burt et al. ................... 701/202 |
| 6,748,316 | B1 | * | 6/2004 | Takayama et al. .......... 701/200 |
| 6,856,894 | B1 | * | 2/2005 | Bodin et al. ................ 701/206 |
| 2001/0035995 | A1 | | 11/2001 | Ruggiero | |

OTHER PUBLICATIONS

Sutcliffe, et al.; Decentralised Data Fusion Applied to a Network of Unmanned Aerial Vehicles; Inspec AN 7289965; Feb. 2002; pp. 71-76; Piscataway, NJ; USA.

Johnson, et al; Improving Geolocation and Spatial Accuracies with the Modular Integrated Avionics Group; Inspec AN 5467118; pp. 88-97; Apr. 1996; SPIE-Int. Soc. Opt.; England.

(Continued)

*Primary Examiner*—Richard M. Camby
(74) *Attorney, Agent, or Firm*—H. Artoush Ohanian; Mark S. Walker; Biggers & Ohanian, LLP

(57) ABSTRACT

Navigating a UAV including receiving in a remote control device a user's selection of a GUI map pixel that represents a waypoint for UAV navigation, mapping the pixel's location on the GUI to Earth coordinates of the waypoint, transmitting the coordinates of the waypoint to the UAV, reading a starting position from a GPS receiver on the UAV, and piloting the UAV, under control of a navigation computer on the UAV, from the starting position to the waypoint in accordance with a navigation algorithm. While piloting the UAV from the starting position to the waypoint, such embodiments include reading from the GPS receiver a sequence of GPS data representing a flight path of the UAV, and depicting the flight of the UAV with 3D computer graphics, including a computer graphic display of a satellite image of the Earth, in dependence upon the GPS data.

27 Claims, 18 Drawing Sheets

OTHER PUBLICATIONS

Gunapala, et al.; QWIP Technology for Both Military and Civilian Applications; Inspec AN 7255522; Apr. 2001; pp. 498-505; SPIE-Int. Soc. Opt.; England.

Spenny, et al; Closely Supervised Control of a Target-Steered UAV; Inspec AN 6652724;Sep. 1999; pp. 179-190; SPIE-Int. Soc. Opt.; England.

RQ-1 Predator Unmanned Aerial Vehicle; May 2002; pp. 1-3; U.S. Air Force Fact Sheet; USA.

Gormley, et al; Controlling Unmanned Air Vehicles: New Challenges; Mar. 2003; pp. 1-21; Commissioned by the Non-Proliferation Education Center; USA.

Young; Unmanned Aerial Vehicles Web Site; pp. 1-2; NASA GSFC/Wallops Flight Facility, Wallops Island, VA; USA.

Unmanned Aircraft.com Website; http://www.unmannedaircraft.con/.

Stellman, et al.; War Horse; Apr. 2001; Inspec. AN 7295892; vol. 4379; pp. 339-346; SPIE-Int. Soc. Opt.; USA.

Dittrich, et al.; 21st Digital Avionics Systems Conference; Oct. 2002; Inspec. AN 7614545; vol. 2; IEEE; Piscataway, NJ; USA.

Dittrich; Design and Integration of an Unmanned Aerial Vehicle Navigation System; Thesis; May 2002; pp. i-52; Georgia Institute of Technology; USA.

Figure 8: Data link module with removed side panel; pp. 18-37; USA.

Figure 17: Simulated GPS malfunction, on the ground, 15 sec; 38-52; USA.

Somers; Unmanned Aerial Vehicle—Demonstration of Autonomous Flight, 09-9822; 1999 IR&D Home; pp. 1-4; USA.

Brown, et al.; Airporne Reconnaissance XXIII; Jul. 1999; pp. 2-8; vol. 3751; SPIE-Int. Soc. Opt; England.

Nettleton, et al.; Multiple Platform Localization and Map Building; Nov. 2000; pp. 337-347; Inspec AN 6979413; SPEI-Int. Soc. Opt. Eng; US.

Schumacher et al.; Adaptive Control of UAVs in Close-coupled Formation Flight; 2000; pp. 849-853; Insp An 6770904; vol. 6 Danvers, MA; US.

Singh et al; Adaptive Feedback Linearizing Nonlinear Close Formation Control of UAVs; 2000; pp. 854-858; Inspec AN 6770905; vol. 2; Danvers, Ma; US.

21st Digital Avionics Systems Conference; 2002; Inspec AN 7614402; vol. 1; IEEE; Piscataway, NJ; US.

Hallberg, et al.; Development of a Flight Test Systems for Unmanned Air Vehicles; Feb. 1999; pp. 55-65; IEEE vol. 19; Inspec AN 6176739; Monterey, CA; US.

Shiller, et al.; Mission Adaptable Autonomous Vehicles; 1991; pp. 143-150; Inspec AN 4208922; Newton, MA; US.

Fishell; Airporne Reconnaissance XXIII; Jul. 1999; pp. 2-8; vol. 3751; SPIE-Int. Soc. Opt; England.

* cited by examiner

US 7,107,148 B1

NAVIGATING A UAV WITH ON-BOARD NAVIGATION ALGORITHMS WITH FLIGHT DEPICTION

BACKGROUND OF THE INVENTION

1. Field of the Invention

The field of the invention is data processing, or, more specifically, methods, systems, and products for navigating an unmanned aerial vehicle ("UAV").

2. Description of Related Art

Many forms of UAV are available in prior art, both domestically and internationally. Their payload weight carrying capability, their accommodations (volume, environment), their mission profiles (altitude, range, duration), and their command, control and data acquisition capabilities vary significantly. Routine civil access to these various UAV assets is in an embryonic state.

Conventional UAVs are typically manually controlled by an operator who may view aspects of a UAV's flight using cameras installed on the UAV with images provided through downlink telemetry. Navigating such UAVs from a starting position to one or more waypoints requires an operator to have specific knowledge of the UAV's flight, including such aspects as starting location, the UAV's current location, waypoint locations, and so on. Operators of prior art UAVs usually are required generally to manually control the UAV from a starting position to a waypoint with little aid from automation. There is therefore an ongoing need for improvement in the area of UAV navigations.

SUMMARY OF THE INVENTION

Methods, systems, and products are described for UAV navigation that enable an operator to input a single interface operation, a mouseclick or joystick button click, thereby selecting GUI pixel from a displayed map of the surface of the Earth. The selected pixel maps to a waypoint. The waypoint is uploaded through uplink telemetry to a UAV which calculates a heading and flies, according to a navigation algorithm, a course to the waypoint. The heading is not necessarily the course if wind is present, depending on the navigation algorithm chosen for the flight. All this occurs with a single keystroke or mouseclick from the operator.

The operator's remote control device from which the pixel is selected is enabled according to embodiments of the present invention to be very thin. Often the remote control device can be a browser in a laptop or personal computer or a microbrowser in a PDA enhanced only with client-side scripting sufficient to map a pixel to a waypoint and transmit the waypoint to the UAV. The UAV itself generally comprises the intelligence, the navigation algorithms, a web server to download map images to a client browser in a remote control device, a repository of Landsat maps from which HTML screens are formulated for download to the remote control device, and so on.

In addition to uplinking a single waypoint, operators of remote control devices according to embodiments of the present invention are enabled to enter through a user interface and upload to the UAV many waypoints which taken in sequence form an entire mission for a UAV that flies from waypoint to waypoint, eventually returning to a starting point. In addition to providing for a mission route comprising many waypoints, typical embodiments also support 'macros,' sets of UAV instructions associated with waypoints. Such UAV instructions can include, for example, instructions to orbit, take photographs or stream video, and continue flying a route or mission to a next waypoint. Because waypoints are entered with selected pixels and macros may be created by selecting UAV instructions from a pull down menu in a GUI, complex missions may be established with a few keystrokes of mouseclicks on an interface of a remote control device. Because the waypoints and UAV instructions are uploaded and stored on the UAV along with the navigation algorithms needed to travel from waypoint to waypoint, the remote control device may lose communications with the UAV or even be destroyed completely, and the UAV will simply continue its mission.

More particularly, methods, systems, and products are disclosed in this specification for navigating a UAV. Typical embodiments include receiving in a remote control device a user's selection of a GUI map pixel that represents a waypoint for UAV navigation, the pixel having a location on the GUI, mapping the pixel's location on the GUI to Earth coordinates of the waypoint, transmitting the coordinates of the waypoint to the UAV, reading a starting position from a GPS receiver on the UAV, and piloting the UAV, under control of a navigation computer on the UAV, from the starting position to the waypoint in accordance with a navigation algorithm. While piloting the UAV from the starting position to the waypoint, such embodiments include reading from the GPS receiver a sequence of GPS data representing a flight path of the UAV, and depicting the flight of the UAV with 3D computer graphics, including a computer graphic display of a satellite image of the Earth, in dependence upon the GPS data.

In many embodiments, depicting the flight of the UAV includes determining, on the UAV, a display attitude of the UAV in dependence upon the sequence of GPS data, calculating, on the UAV, from the sequence of GPS data, the UAV's course, creating, on the UAV, images for display in dependence upon the display attitude, the course, and a satellite image stored on the UAV, and downloading the images for display from the UAV to the remote control device. In some embodiments, depicting the flight of the UAV includes downloading the GPS sequence from the UAV to the remote control device, determining, in the remote control device, a display attitude of the UAV in dependence upon the sequence of GPS data, calculating, in the remote control device, from the sequence of GPS data, the UAV's course, and creating, in the remote control device, images for display in dependence upon the display attitude, the course, and a satellite image stored on the remote control device.

In many embodiments, depicting the flight of the UAV includes determining a display attitude of the UAV in dependence upon the sequence of GPS data, including detecting changes in the UAV's course from the sequence of GPS data, and determining a display roll angle in dependence upon the detected course changes. In some embodiments, depicting the flight of the UAV includes determining a display attitude of the UAV in dependence upon the sequence of GPS data, including detecting changes in the UAV's course from the sequence of GPS data, and determining a display yaw angle in dependence upon the detected course changes. In many embodiments, depicting the flight of the UAV includes determining a display attitude of the UAV in dependence upon the sequence of GPS data, including detecting changes in the UAV's altitude from the sequence of GPS data, determining a display pitch angle in dependence upon the detected altitude changes.

Many embodiments include receiving user selections of a multiplicity of GUI map pixels representing waypoints, each pixel having a location on the GUI, mapping each pixel location to Earth coordinates of a waypoint, assigning one or more UAV instructions to each waypoint, transmitting the coordinates of the waypoints and the UAV instructions to the UAV, storing the coordinates of the waypoints and the UAV instructions in computer memory on the UAV, piloting the UAV to each waypoint in accordance with one or more navigation algorithms, and operating the UAV at each waypoint in accordance with the UAV instructions for each waypoint. In some embodiments, mapping the pixel's location on the GUI to Earth coordinates of the waypoint includes mapping pixel boundaries of the GUI map to Earth coordinates, identifying a range of latitude and a range of longitude represented by each pixel, and locating a region on the surface of the Earth in dependence upon the boundaries, the ranges, and the location of the pixel on the GUI map.

In many embodiments, wherein locating a region on the surface of the Earth in dependence upon the boundaries, the ranges, and the location of the pixel on the GUI map includes multiplying the range of longitude represented by each pixel by a column number of the selected pixel, yielding a first multiplicand, multiplying the range of longitude represented by each pixel by 0.5, yielding a second multiplicand, adding the first and second multiplicands to an origin longitude of the GUI map, multiplying the range of latitude represented by each pixel by a row number of the selected pixel, yielding a third multiplicand, multiplying the range of latitude represented by each pixel by 0.5, yielding a fourth multiplicand, and adding the third and fourth multiplicands to an origin latitude of the GUI map.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
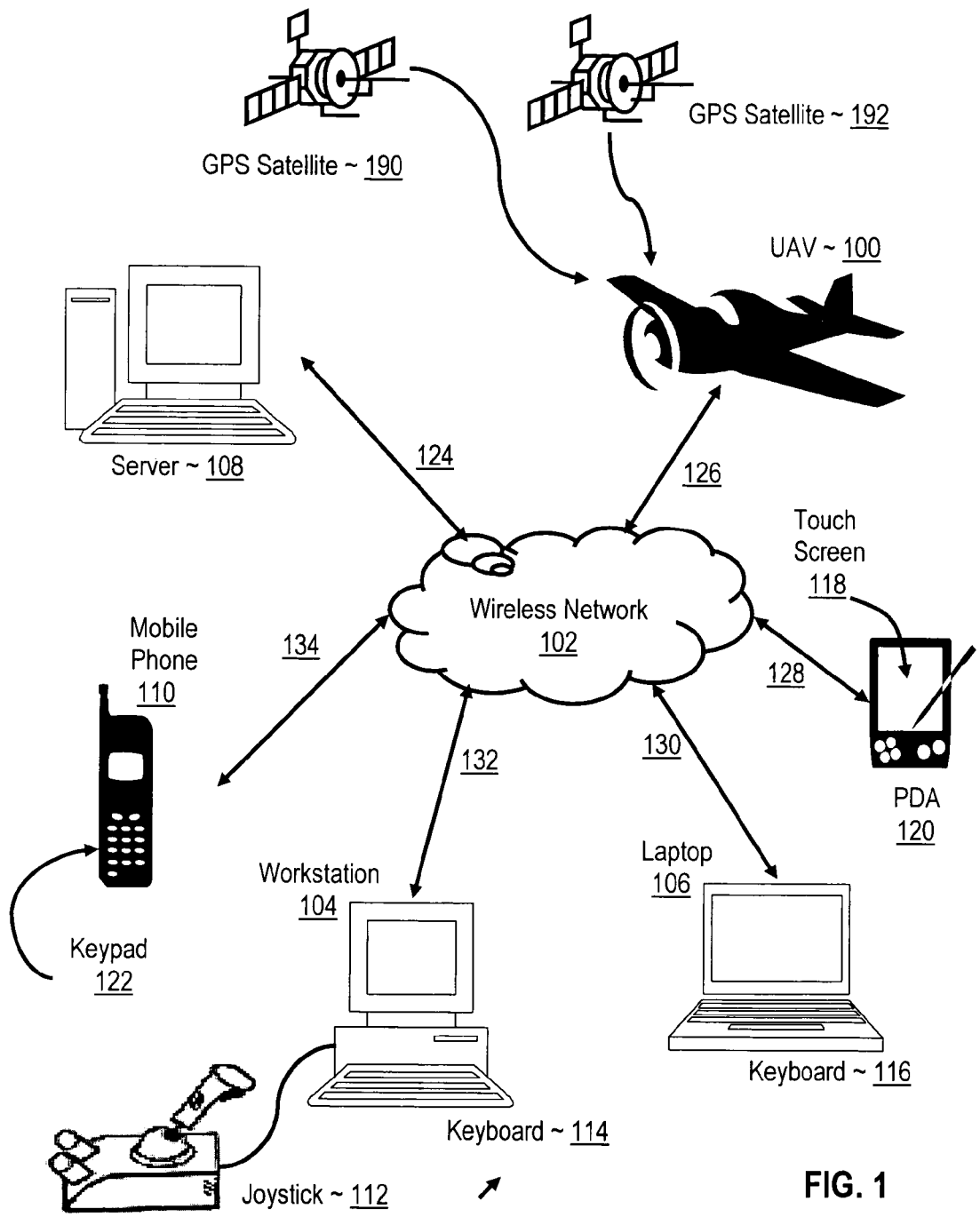
FIG. 1 sets forth a system diagram illustrating relations among components of an exemplary system for navigating a UAV.

The present invention is described to a large extent in this specification in terms of methods for navigating a UAV. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Air speed" means UAV air speed, the speed of the UAV through the air.

A "cross track" is a fixed course from a starting point directly to a waypoint. A cross track has a direction, a 'cross track direction,' that is the direction straight from a starting point to a waypoint. That is, a cross track direction is the heading that a UAV would fly directly from a starting point to a waypoint in the absence of wind.

"GUI" means graphical user interface, a display means for a computer screen.

"Heading" means the compass heading of the UAV. "Course" means the direction of travel of the UAV over the ground. That is, a "course" in this specification is what is called, in some lexicons of air navigation, a 'track.' In the absence of wind, or in the presence of a straight tailwind or straight headwind, the course and the heading are the same direction. In the presence of crosswind, the course and the heading are different directions.

"Position" refers to a location in the air or over the ground. 'Position' is typically specified as Earth coordinates, latitude and longitude. A specification of position may also include altitude.

A "waypoint" is a position chosen as a destination for navigation of a route. A route has one or more waypoints. That is, a route is composed of waypoints, including at least one final waypoint, and one or more intermediate waypoints.

"TDMA" stands for Time Division Multiple Access, a technology for delivering digital wireless service using time-division multiplexing. TDMA works by dividing a radio frequency into time slots and then allocating slots to multiple calls. In this way, a single frequency can support multiple, simultaneous data channels. TDMA is used by GSM.

"GSM" stands for Global System for Mobile Communications, a digital cellular standard. GSM at this time is the de facto standard for wireless digital communications in Europe and Asia.

"CDPD" stands for Cellular Digital Packet Data, a data transmission technology developed for use on cellular phone frequencies. CDPD uses unused cellular channels to transmit data in packets. CDPD supports data transfer rates of up to 19.2 Kbps.

"GPRS" stands for General Packet Radio Service, a standard for wireless data communications which runs at speeds up to 150 Kbps, compared with current GSM systems which cannot support more than about 9.6 Kbps. GPRS, which supports a wide range of speeds, is an efficient use of limited bandwidth and is particularly suited for sending and receiving small bursts of data, such as e-mail and Web browsing, as well as large volumes of data.

"EDGE" stands for Enhanced Data Rates for GSM Evolution, a standard for wireless data communications supporting data transfer rates of more than 300 Kbps. GPRS and EDGE are considered interim steps on the road to UMTS.

"UMTS" stands for Universal Mobile Telecommunication System, a standard for wireless data communications supporting data transfer rates of up to 2 Mpbs. UMTS is also referred to W-CDMA for Wideband Code Division Multiple Access.

Navigating a UAV with On-board Navigation Algorithms With Flight Depiction

Methods, systems, and products for navigating a UAV are explained with reference to the accompanying drawings, beginning with FIG. 1. FIG. 1 sets forth a system diagram illustrating relations among components of an exemplary system for navigating a UAV. The system of FIG. 1 includes UAV (100) which includes a GPS (Global Positioning System) receiver (not shown) that receives a steady stream of GPS data from satellites (190, 192). For convenience of explanation, only two GPS satellites are shown in FIG. 1, although the GPS satellite network in fact includes 24 GPS satellites.

The system of FIG. 1 operates to navigate a UAV by receiving in a remote control device a user's selection of a GUI map pixel that represents a waypoint for UAV navigation. Each such pixel has a location on a GUI map, typically specified as a row and column position. Examples of remote control devices in FIG. 1 include mobile telephone (110), workstation (104), laptop computer (116), and PDA (Personal Digital Assistant) (120). Each such remote control device is capable of supporting a GUI display of a map of the surface of the Earth in which each pixel on the GUI map represents a position on the Earth.

Each remote control device also supports at least one user input device through which a user may enter the user's selection of a pixel. Examples of user input devices in the system of FIG. 1 include telephone keypad (122), workstation keyboard (114), workstation joystick (112), laptop keyboard (116) and PDA touch screen (118).

The system of FIG. 1 typically is capable of operating a remote control device to map the pixel' location on the GUI to Earth coordinates of a waypoint and to transmit the coordinates of the waypoint to the UAV (100). In the example of FIG. 1, waypoint coordinates are generally transmitted from remote control devices to the UAV through wireless network (102). Wireless network (102) is implemented using any wireless data transmission technology as will occur to those of skill in the art including, for example, TDMA, GSM, CDPD, GPRS, EDGE, and UMTS. In a preferred embodiment, a data communications link layer is implemented using one of these technologies, a data communications network layer is implemented with the Internet Protocol ("IP"), and a data communications transmission layer is implemented using the Transmission Control Protocol ("TCP"). In such systems, telemetry between the UAV and remote control devices, including waypoint coordinates, are transmitted using an application-level protocol such as, for example, the HyperText Transmission Protocol ("HTTP"), the Wireless Application Protocol ("WAP"), the Handheld Device Transmission Protocol ("HDTP"), or any other data communications protocol as will occur to those of skill in the art.

The system of FIG. 1 typically is capable of operating a UAV to read a starting position from a GPS receiver (reference 186 on FIG. 2) on the UAV and pilot the UAV, under control of a navigation computer on the UAV, from a starting position to a waypoint in accordance with a navigation algorithm. The system of FIG. 1 is also capable of reading from the GPS receiver on the UAV a sequence of GPS data representing a flight path of the UAV and depicting the flight of the UAV with 3D computer graphics while the UAV is piloting under control of a navigation computer on the UAV.

Figure 2:
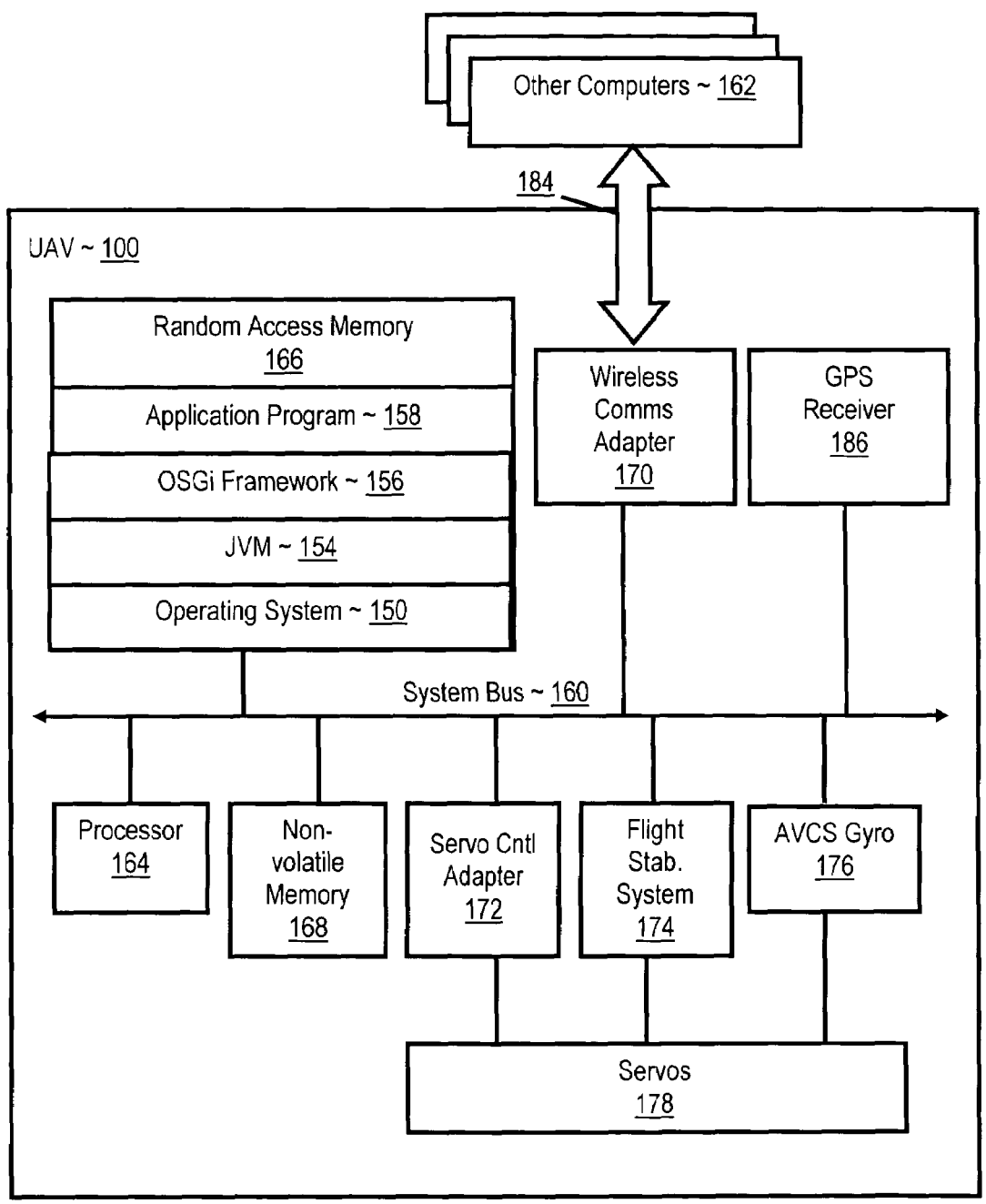
FIG. 2 is a block diagram of an exemplary UAV showing relations among components of included automated computing machinery.

UAVs according to embodiments of the present invention typically include, not only an aircraft, but also automated computing machinery capable of receiving GPS data, operating telemetry between the UAV and one or more remote control devices, and navigating a UAV among waypoints. FIG. 2 is a block diagram of an exemplary UAV showing relations among components of included automated computing machinery. In FIG. 2, UAV (100) includes a processor (164), also typically referred to as a central processing unit or 'CPU.' The processor may be a microprocessor, a programmable control unit, or any other form of processor useful according to the form factor of a particular UAV as will occur to those of skill in the art. Other components of UAV (100) are coupled for data transfer to processor (164) through system bus (100).

UAV (100) includes random access memory or 'RAM' (166). Stored in RAM (166) is an application program (158) that implements inventive methods according to embodiments of the present invention. In some embodiments, the application programming runs on an OSGi services framework (156). OSGi Stands for 'Open Services Gateway Initiative.' The OSGi specification is a Java-based application layer framework that provides vendor neutral application layer APIs and functions. An OSGi service framework (126) is written in Java and therefore typically runs on a Java Virtual Machine (JVM) (154) which in turn runs on an operating system (150). Examples of operating systems useful in UAVs according to the present invention include Unix, AIX™, and Microsoft Windows™.

In OSGi, the framework is a hosting platform for running 'services'. Services are the main building blocks for creating applications according to the OSGi. A service is a group of Java classes and interfaces that implement a certain feature. The OSGi specification provides a number of standard services. For example, OSGi provides a standard HTTP service that can respond to requests from HTTP clients, such as, for example, remote control devices according to embodiments of the present invention. That is, such remote control devices are enabled to communicate with a UAV having an HTTP service by use of data communications messages in the HTTP protocol.

Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

The services framework in OSGi also includes a service registry. The service registry includes a service registration including the service's name and an instance of a class that implements the service for each bundle installed on the framework and registered with the service registry. A bundle may request services that are not included in the bundle, but are registered on the framework service registry. To find a service, a bundle performs a query on the framework's service registry.

In the UAV (100) of FIG. 2, software programs and other useful information may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art. UAV (100) includes communications adapter (170) implementing data communications connections (184) to other computers (162), which may be wireless networks, satellites, remote control devices, servers, or others as will occur to those of skill in the art. Communications adapters implement the hardware level of data communications connections through which UAVs transmit wireless data communications. Examples of communications adapters include wireless modems for dial-up connections through wireless telephone networks.

UAV (100) includes servos (178). Servos (178) are proportional control servos that convert digital control signals from system bus (160) into actual proportional displacement of flight control surfaces, ailerons, elevators, and the rudder. The displacement of flight control surfaces is 'proportional' to values of digital control signals, as opposed to the 'all or nothing' motion produces by some servos. In this way, ailerons, for example, may be set to thirty degrees, sixty degrees, or any other supported angle rather than always being only neutral or fully rotated. Several proportional control servos useful in various UAVs according to embodiments of the present invention are available from Futaba®.

UAV (100) includes a servo control adapter (172). A servo control adapter (172) is multi-function input/output servo motion controller capable of controlling several servos. An example of such a servo control adapter is the "IOSERVO" model from National Control Devices of Osceola, Mo. The IOSERVO is described on National Control Devices website at www.controlanything.com.

UAV (100) includes a flight stabilizer system (174). A flight stabilizer system is a control module that operates servos (178) to automatically return a UAV to straight and level flight, thereby simplifying the work that must be done by navigation algorithms. An example of a flight stabilizer system useful in various embodiments of UAVs according to the present invention is model Co-Pilot$_{TM}$from FMA, Inc., of Frederick, Md. The Co-Pilot flight stabilizer system identifies a horizon with heat sensors, identifies changes in aircraft attitude relative to the horizon, and sends corrective signals to the servos (178) to keep the UAV flying straight and level.

UAV (100) includes an AVCS gyro (176). An AVCS gryo is an angular vector control system gyroscope that provides control signal to the servos to counter undesired changes in attitude such as those caused by sudden gusts of wind. An example of an AVCS gyro useful in various UAVs according to the present invention is model GYA350 from Futaba®.

Figure 3:
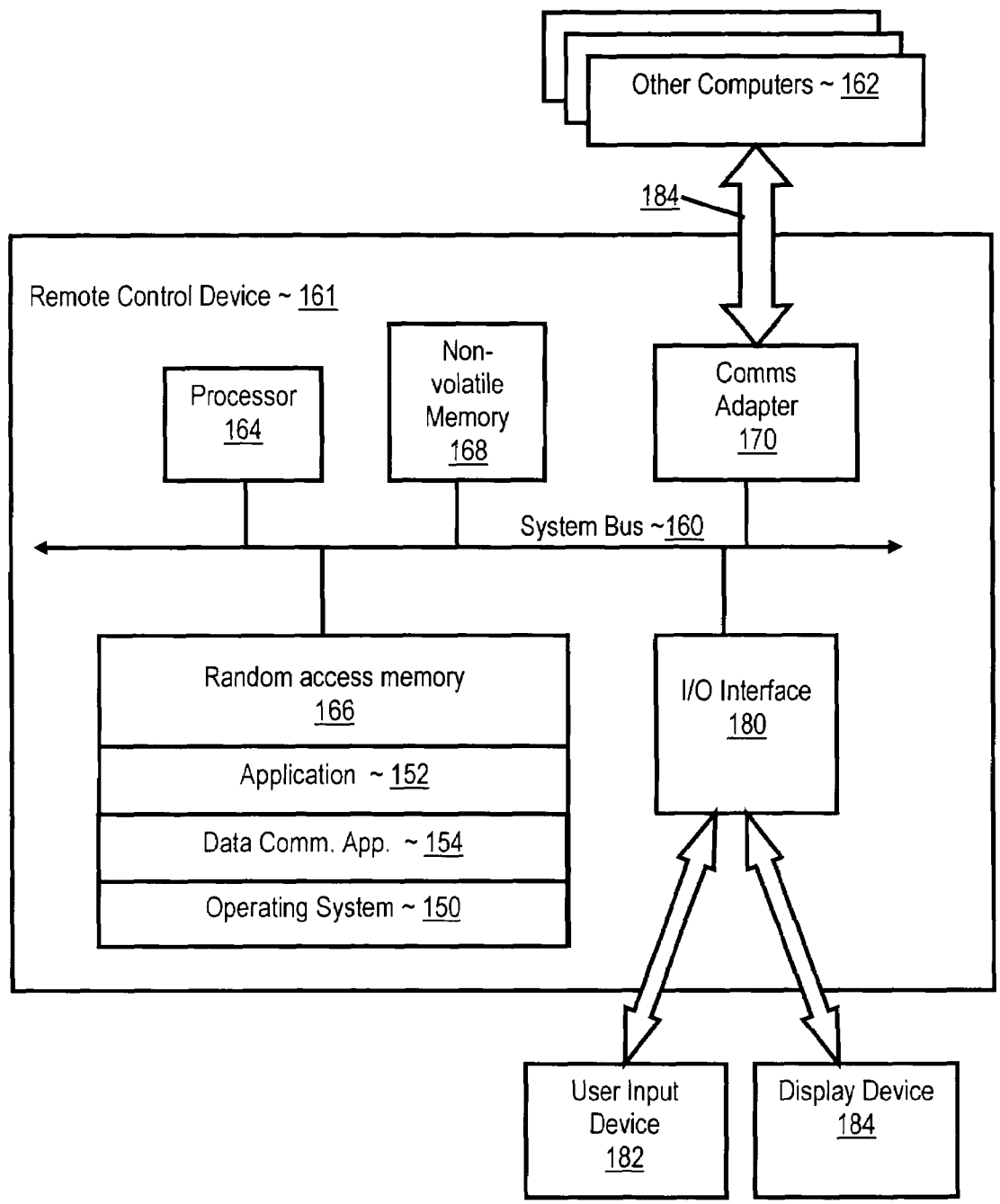
FIG. 3 is a block diagram of an exemplary remote control device showing relations among components of included automated computing machinery.

Remote control devices according to embodiments of the present invention typically comprise automated computing machinery capable of receiving user selections of pixel on GUI maps, mapping the pixel to a waypoint location, and transmitting the waypoint location to a UAV. FIG. 3 is a block diagram of an exemplary remote control device showing relations among components of included automated computing machinery. In FIG. 3, remote control device (161) includes a processor (164), also typically referred to as a central processing unit or 'CPU.' The processor may be a microprocessor, a programmable control unit, or any other form of processor useful according to the form factor of a particular remote control device as will occur to those of skill in the art. Other components of remote control device (161) are coupled for data transfer to processor (164) through system bus (160).

Remote control device (161) includes random access memory or 'RAM' (166). Stored in RAM (166) an application program 152 that implements inventive methods of the present invention. In some embodiments, the application program (152) is OSGi compliant an therefore runs on an OSGi services framework installed (not shown) on a JVM (not shown). In addition, software programs and further information for use in implementing methods of navigating a UAV according to embodiments of the present invention may be stored in RAM or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

Remote control device (161) includes communications adapter (170) implementing data communications connections (184) to other computers (162), including particularly computes on UAVs. Communications adapters implement the hardware level of data communications connections through which remote control devices communicate with UAVs directly or through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

The example remote control device (161) of FIG. 3 includes one or more input/output interface adapters (180). Input/output interface adapters in computers implement user-oriented input/output through, for example, software drivers and computer hardware for controlling output to display devices (184) such as computer display screens, as well as user input from user input devices (182) such as keypads, joysticks, keyboards, and touch screens.

Figure 4:
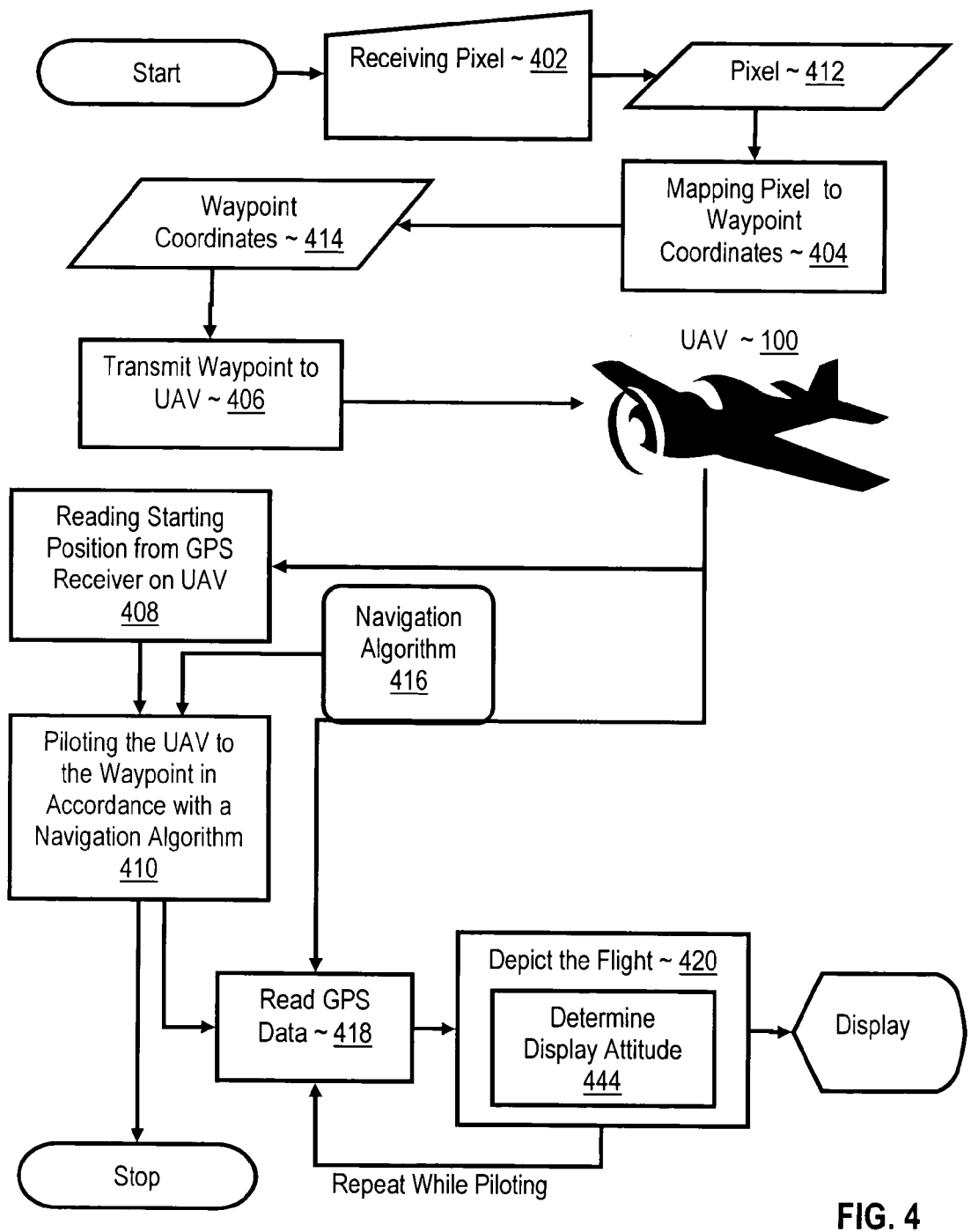
FIG. 4 sets forth a flow chart illustrating an exemplary method for navigating a UAV that includes receiving in a remote control device a user's selection of a GUI map pixel that represents a waypoint for UAV navigation.

FIG. 4 sets forth a flow chart illustrating an exemplary method for navigating a UAV that includes receiving (402) in a remote control device a user's selection of a GUI map pixel (412) that represents a waypoint for UAV navigation. The pixel has a location on the GUI. Such a GUI map display has many pixels, each of which represents at least one position on the surface of the Earth. A user selection of a pixel is normal GUI operations to take a pixel location, row and column, from a GUI input/output adapter driven by a user input device such as a joystick or a mouse. The control device can be a traditional 'ground control station,' an airborne PDA or laptop, a workstation in Earth orbit, or any other control device capable of accepting user selections of pixels from a GUI map.

The method of FIG. 4 includes mapping (404) the pixel's location on the GUI to Earth coordinates of the waypoint (414). As discussed in more detail below with reference to FIG. 5, mapping (404) the pixel's location on the GUI to Earth coordinates of the waypoint (414) typically includes mapping pixel boundaries of the GUI map to corresponding Earth coordinates and identifying a range of latitude and a range of longitude represented by each pixel. Mapping (404) the pixel's location on the GUI to Earth coordinates of the waypoint (414) also typically includes locating a region on the surface of the Earth in dependence upon the boundaries, the ranges, and the location of the pixel on the GUI map.

The method of FIG. 4 also includes transmitting (406) the coordinates of the waypoint to the UAV (100). Transmitting (406) the coordinates of the waypoint to the UAV (100) may be carried out by use of any data communications protocol, including, for example, transmitting the coordinates as form data, URI encoded data, in an HTTP message, a WAP message, an HDML message, or any other data communications protocol message as will occur to those of skill in the art.

The method of FIG. 4 also includes reading (408) a starting position from a GPS receiver on the UAV (100) and piloting (410) the UAV, under control of a navigation computer on the UAV, from the starting position to the waypoint in accordance with a navigation algorithm (416). Methods of piloting a UAV according to a navigation algorithm are discussed in detail below in this specification.

While piloting the UAV from the starting position to the waypoint, the method of FIG. 4 also includes reading (418) from the GPS receiver a sequence of GPS data representing a flight path of the UAV and depicting (420) the flight of the UAV with 3D computer graphics, including a computer graphic display of a satellite image of the Earth, in dependence upon the GPS data. In the method of FIG. 4, depicting (420) the flight of the UAV includes determining (444) a display attitude of the UAV in dependence upon the sequence of GPS data. Display attitude is not based upon actual attitude data such as would be had from gyro sensors, for example. In this disclosure, 'display attitude' refers to data describing orientation of a display image depicting a flight. The display attitude describes flight orientation in terms of roll, pitch, and yaw values derived from GPS data, not from measures of actual roll, pitch, and yaw.

In the method of FIG. 4, determining (444) a display attitude of the UAV in dependence upon the sequence of GPS data typically also includes detecting changes in the UAV's course from the sequence of GPS data and determining a display roll angle in dependence upon the detected course changes. In some embodiments, a sequence of GPS locations is used to calculate a rate of change of course, a value measured in degrees per second. In such embodiments, display roll angle often is then determined linearly according to the rate of course change, so that a displayed angle of the wings on a UAV icon on a GUI display is proportional to the rate of course change. The faster the course change, the steeper the display roll angle.

It is useful to note, however, that there is no required relationship between course change rate and display attitude. Embodiments of UAV navigation systems according to embodiments of the present invention may utilize no data whatsoever describing or representing the actual physical flight attitude of a UAV. The determinations of 'display attitude' are determination of values for data structures affecting a GUI display on a computer, not depictions of actual UAV attitude. To the extent that display attitudes are determined in calculated linear relations to actual position changes or course change rates, such display attitudes may result in displays that model fairly closely the actual flight attitude of a UAV. This is not a limitation of the invention, however. In fact, in some embodiments there is no attempt at all to determine display attitudes that closely model actual flight attitudes. Some embodiments consider it sufficient, for example, upon detecting a clockwise turn, always to simply assign a display roll angle of thirty degrees without more. Such embodiments do give a visual indication of roll, thereby indicating a turn, but they do not attempt to indicate an actual rate of change by varying the roll angle.

In the method of FIG. 4, determining (444) a display attitude of the UAV in dependence upon the sequence of GPS data may also include detecting changes in the UAV's course from the sequence of GPS data and determining a display yaw angle in dependence upon the detected course changes. In the method of FIG. 4, determining (444) a display attitude of the UAV in dependence upon the sequence of GPS data may also include detecting changes in the UAV's altitude from the sequence of GPS data and determining a display pitch angle in dependence upon the detected altitude changes.

Figure 4A:
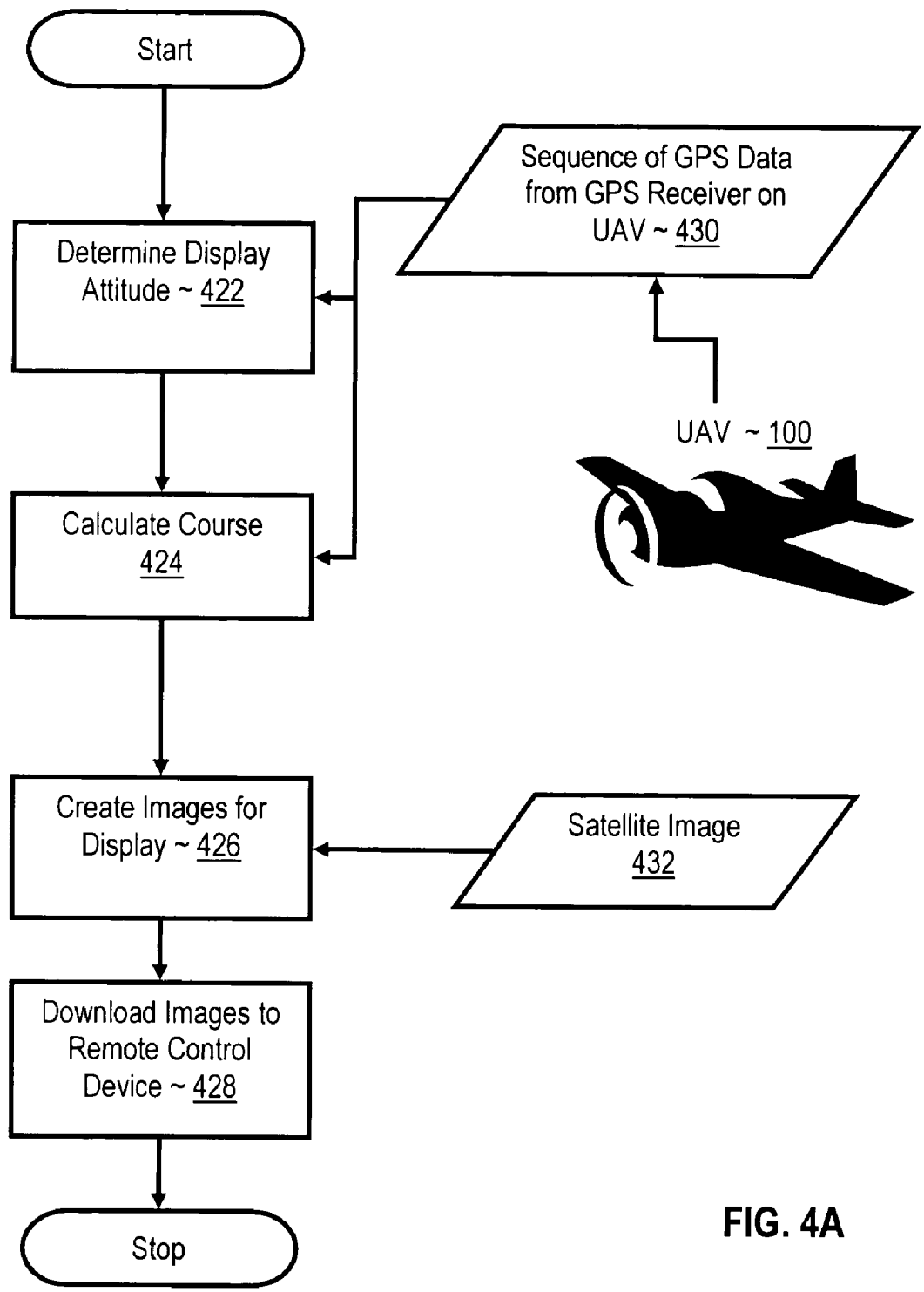
FIG. 4A sets forth a flow chart illustrating an exemplary method of depicting the flight of the UAV.

FIG. 4A sets forth a flow chart illustrating an exemplary method of depicting the flight of the UAV. In the method of FIG. 4A, depicting the flight of the UAV includes determining (422), on the UAV, a display attitude of the UAV in dependence upon the sequence of GPS data (430). In the method of FIG. 4A, depicting the flight of the UAV includes calculating (424), on the UAV, from the sequence of GPS data, the UAV's course. In the method of FIG. 4A, depicting the flight of the UAV includes creating (426), on the UAV, images for display in dependence upon the display attitude, the course, and a satellite image stored on the UAV and downloading (428) the images for display from the UAV to the remote control device.

Figure 4B:
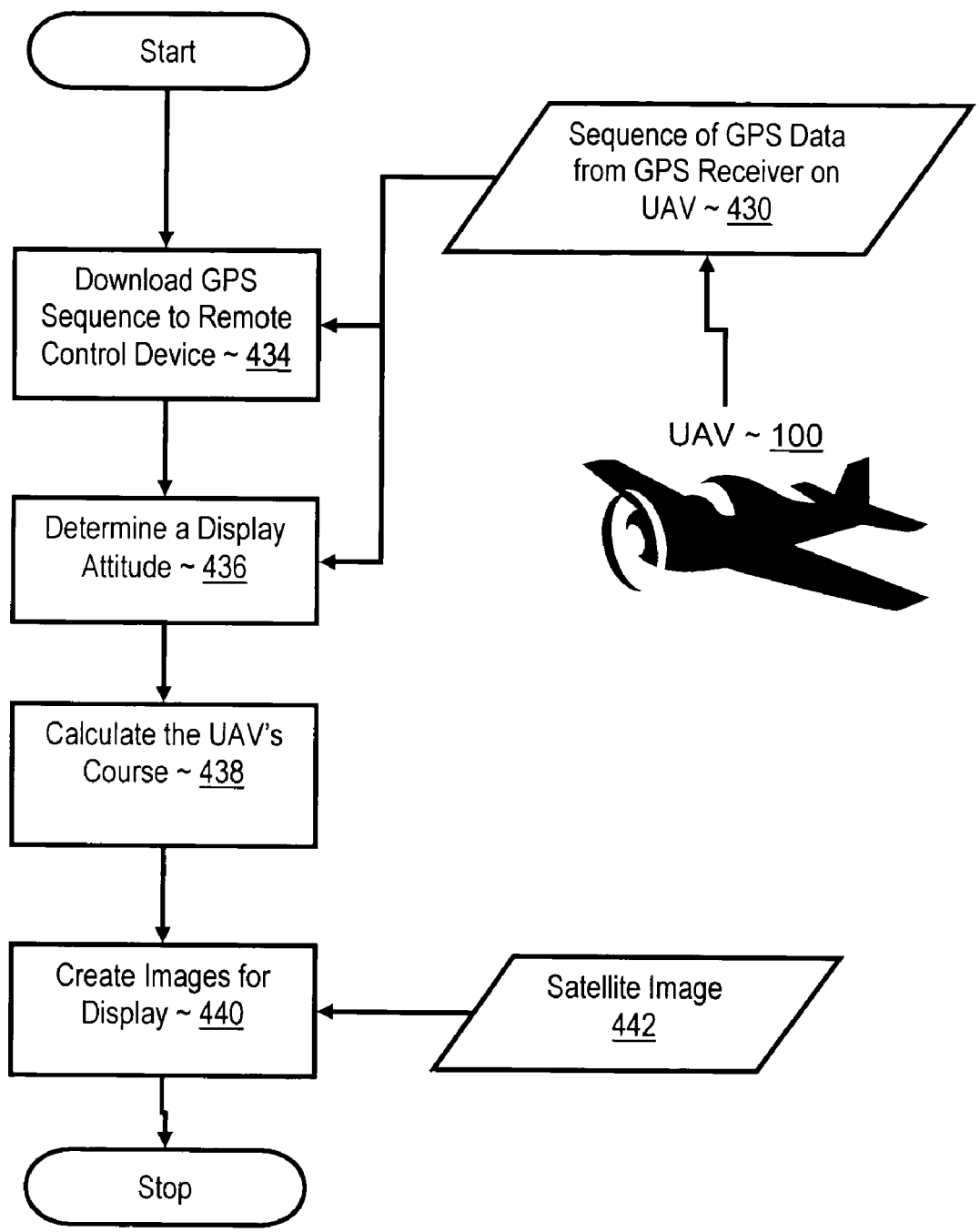
FIG. 4B sets forth a flow chart illustrating another exemplary method of depicting the flight of the UAV.

FIG. 4B sets forth a flow chart illustrating another exemplary method of depicting the flight of the UAV. In the method of FIG. 4B, depicting the flight of the UAV includes downloading (434) the GPS sequence (430) from the UAV to the remote control device and determining (436), in the remote control device, a display attitude of the UAV in dependence upon the sequence of GPS data. In the method of FIG. 4B, depicting the flight of the UAV includes calculating (438), in the remote control device, from the sequence of GPS data, the UAV's course. In the method of FIG. 4B, depicting the flight of the UAV includes creating (440), in the remote control device, images for display in dependence upon the display attitude, the course, and a satellite image (442) stored on the remote control device.

Whether the images for display are created on the UAV or on the remote control device, UAV navigation systems according to embodiments of the present invention typically create images for display by use of 3D graphics rendering engines. One example of such an engine is DarkBasic™, from Enteractive Software, Inc., of Hartford, Conn. This example is discussed in terms of DarkBasic, but the use of DarkBasic is not a limitation of the present invention. Many other 3D graphics engines may be used, including APIs for OpenGL, DirectX, Direct3D, and others as will occur to those of skill in the art.

DarkBasic provides its API as an extended version of the Basic programming language for orienting a view of a JPEG map of the Earth's surface in accordance with data describing the location of a UAV over the Earth and the UAV's attitude in terms of roll, pitch, yaw, and course. Satellite images of the Earth's surface in the form of JPEG maps suitable for use in DarkBasic rendering engines are available, for example, from Satellite Imaging Corporation of Houston, Tex. The DarkBasic API commands "GET IMAGE" and "LOAD IMAGE" import JPEG images into a DarkBasic rendering engine.

DarkBasic "CAMERA" commands are used to orient a view of a JPEG map. The DarkBasic command "POSITION CAMERA" may be used to set an initial view position to a starting point and to move the view position to new locations in dependence upon a sequence GPS data. The DarkBasic command "POINT CAMERA" may be used to orient the view to a UAV's course. When display attitudes are determined according to methods of the current invention, the DarkBasic commands "TURN CAMERA LEFT" and "TURN CAMERA RIGHT" may be used to orient the view according to display yaw angle; the DarkBasic commands "PITCH CAMERA UP" and "PITCH CAMERA DOWN" may be used to orient the view according to display pitch angle; and the DarkBasic commands "ROLL CAMERA LEFT" and "ROLL CAMERA RIGHT" may be used to orient the view according to display roll angle.

Macros

Although the flow chart of FIG. 4 illustrates navigating a UAV to a single waypoint, as a practical matter, embodiments of the present invention support navigating a UAV along a route having many waypoints, including a final waypoint and one or more intermediate waypoints. That is, methods of the kind illustrated in FIG. 4 may also include receiving user selections of a multiplicity of GUI map pixels representing waypoints, where each pixel has a location on the GUI and mapping each pixel location to Earth coordinates of a waypoint.

Such methods of navigating a UAV can also include assigning one or more UAV instructions to each waypoint and transmitting the coordinates of the waypoints and the UAV instructions to the UAV. A UAV instruction typically includes one or more instructions for a UAV to perform a task in connection with a waypoint. Exemplary tasks include turning on or off a camera installed on the UAV, turning on or off a light installed on the UAV, orbiting a waypoint, or any other task that will occur to those of skill in the art.

Such exemplary methods of navigating a UAV also include storing the coordinates of the waypoints and the UAV instructions in computer memory on the UAV, piloting the UAV to each waypoint in accordance with one or more navigation algorithms, and operating the UAV at each waypoint in accordance with the UAV instructions for each waypoint. UAV instructions to perform tasks in connection with a waypoint may be encoded in, for example, XML (the extensible Markup Language) as shown in the following exemplary XML segment:

```
<UAV-Instructions>
   <macro>
      <waypoint> 33° 44' 10" N 30° 15' 50" W </waypoint>
      <instruction> orbit </instruction>
      <instruction> videoCameraON </instruction>
      <instruction> wait30minutes </instruction>
      <instruction> videoCameraOFF </instruction>
      <instruction> nextWaypoint </instruction>
   </macro>
   <macro> </macro>
   <macro> </macro>
   <macro> </macro>
<UAV-instructions>
```

This XML example has a root element named 'UAV-instructions.' The example contains several subelements named 'macro.' One 'macro' subelement contains a waypoint location representing an instruction to fly to 33° 44' 10" N 30° 15' 50" W. That macro subelement also contains several instructions for tasks to be performed when the UAV arrives at the waypoint coordinates, including orbiting around the waypoint coordinates, turning on an on-board video camera, continuing to orbit for thirty minutes with the camera on, turning off the video camera, and continuing to a next waypoint. Only one macro set of UAV instructions is shown in this example, but that is not a limitation of the invention. In fact, such sets of UAV instructions may be of any useful size as will occur to those of skill in the art.

Pixel Mapping

Figure 5:
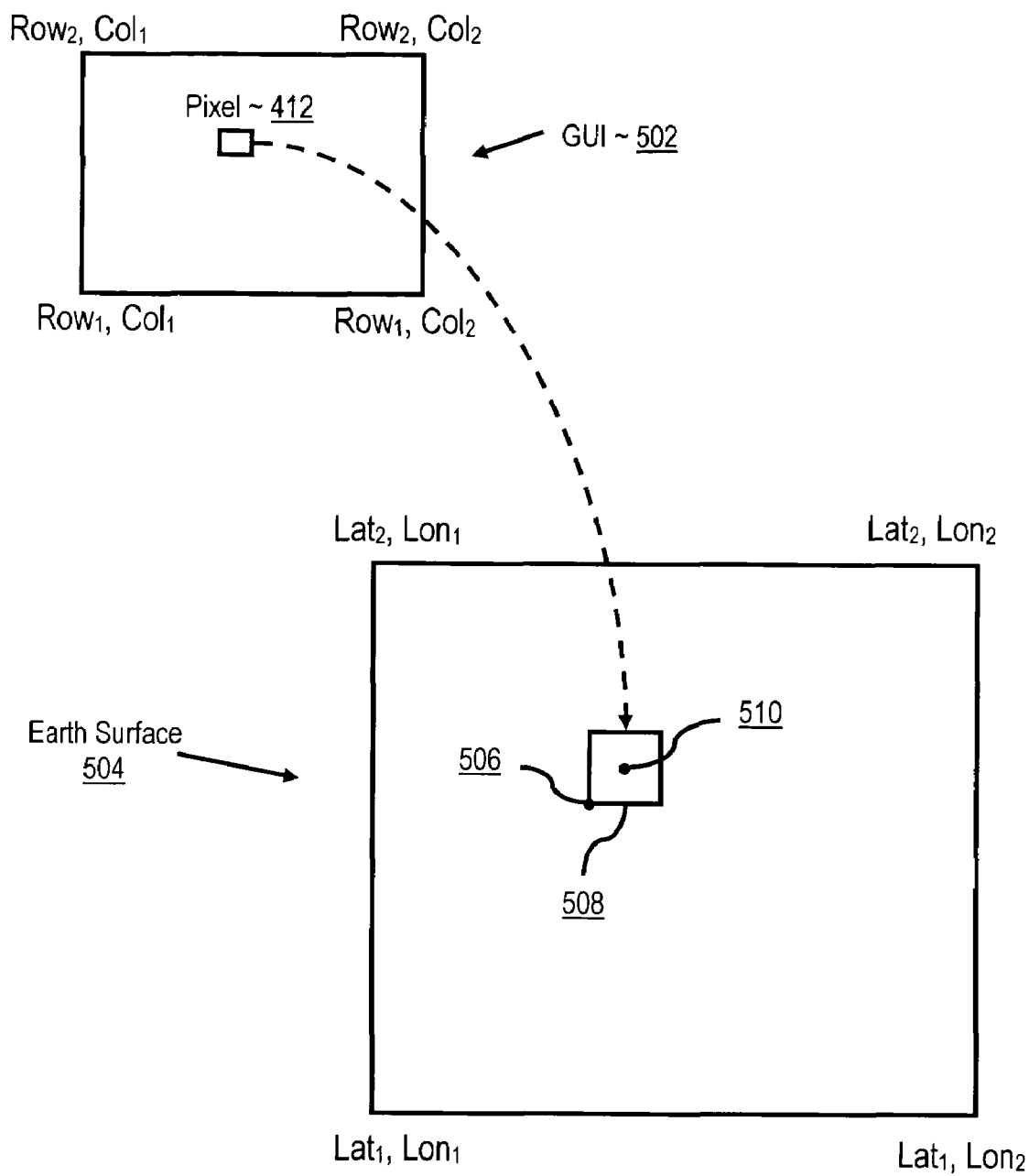
FIG. 5 sets forth a block diagram that includes a GUI displaying a map and a corresponding area of the surface of the Earth.

For further explanation of the process of mapping pixels' locations to Earth coordinates, FIG. 5 sets forth a block diagram that includes a GUI (502) displaying a map (not shown) and a corresponding area of the surface of the Earth (504). The GUI map has pixel boundaries identified as $Row_1, Col_1$; $Row_1, Col_{100}$; $Row_{100}, Col_{100}$; and $Row_{100}, Col_1$. In this example, the GUI map is assumed to comprise 100 rows of pixels and 100 columns of pixels. This example of 100 rows and columns is presented for convenience of explanation; it is not a limitation of the invention. GUI maps according to embodiments of the present invention may include any number of pixels as will occur to those of skill in the art.

The illustrated area of the surface of the Earth has corresponding boundary points identified as $Lat_1, Lon_1$; $Lat_1, Lon_2$; $Lat_2, Lon_2$; and $Lat_2, Lon_1$. This example assumes that the distance along one side of surface area (504) is 100 nautical miles, so that the distance expressed in terms of latitude or longitude between boundary points of surface area (504) is 100 minutes or 1° 40'.

In typical embodiments, mapping a pixel's location on the GUI to Earth coordinates of a waypoint includes mapping pixel boundaries of the GUI map to Earth coordinates. In this example, the GUI map boundary at $Row_1$, $Col_1$ maps to the surface boundary point at $Lat_1$, $Lon_1$; the GUI map boundary at $Row_1$, $Col_2$ maps to the surface boundary point at $Lat_1$, $Lon_2$; the GUI map boundary at $Row_2$, $Col_2$ maps to the surface boundary point at $Lat_2$, $Lon_2$; the GUI map boundary at $Row_2$, $Col_1$ maps to the surface boundary point at $Lat_2$, $Lon_1$.

Mapping a pixel's location on the GUI to Earth coordinates of a waypoint typically also includes identifying a range of latitude and a range of longitude represented by each pixel. The range of latitude represented by each pixel may be described as $(Lat_2-Lat_1)/N_{rows}$, where $(Lat_2-Lat_1)$ is the length in degrees of the vertical side of the corresponding surface (504), and $N_{rows}$ is the number of rows of pixels. In this example, $(Lat_2-Lat_1)$ is 1° 40' or 100 nautical miles, and $N_{rows}$ is 100 rows of pixels. The range of latitude represented by each pixel in this example therefore is one minute of arc or one nautical mile.

Similarly, the range of longitude represented by each pixel may be described as $(Lon_2-Lon_1)/N_{cols}$, where $(Lon_2-Lon_1)$ is the length in degrees of the horizontal side of the corresponding surface (504), and $N_{cols}$ is the number of columns of pixels. In this example, $(Lon_2-Lon_1)$ is 1° 40' or 100 nautical miles, and $N_{cols}$ is 100 columns of pixels. The range of longitude represented by each pixel in this example therefore is one minute of arc or one nautical mile.

Mapping a pixel's location on the GUI to Earth coordinates of a waypoint typically also includes locating a region on the surface of the Earth in dependence upon the boundaries, the ranges, and the location of the pixel on the GUI map. The region is the portion of the surface corresponding the pixel itself. That region is located generally by multiplying in both dimension, latitude and longitude, the range of latitude and longitude by column or row numbers of the pixel location on the GUI map. That is, a latitude for the surface region of interest is given by Expression 1.

$$Lat_1+P_{row}((Lat_2-Lat_1)/N_{rows}) \quad (Exp.\ 1)$$

In Expression 1:
$Lat_1$ is the latitude of an origin point for the surface area (504) corresponding generally to the GUI map,
$P_{row}$ is the row number of the pixel location on the GUI map, and
$((Lat_2-Lat_1)/N_{rows})$ is the range of latitude represented by the pixel.

Similarly, a longitude for the surface region of interest is given by Expression 2.

$$Lon_1+P_{col}((Lon_2-Lon_1)/N_{cols}) \quad (Exp.\ 2)$$

In Expression 2:
$Lon_1$ is the longitude of an origin point for the surface area (504) corresponding generally to the GUI map,
$P_{col}$ is the column number of the pixel location on the GUI map, and
$((Lon_2-Lon_1)/N_{cols})$ is the range of longitude represented by the pixel.

Referring to FIG. 5 for further explanation, Expressions 1 and 2 taken together identify a region (508) of surface area (504) that corresponds to the location of pixel (412) mapping the pixel location to the bottom left corner (506) of the region (508). Advantageously, however, many embodiments of the present invention further map the pixel to the center of the region by adding one half of the length of the region's sides to the location of the bottom left corner (506).

More particularly, locating a region on the surface of the Earth in dependence upon the boundaries, the ranges, and the location of the pixel on the GUI map, as illustrated by Expression 3, may include multiplying the range of longitude represented by each pixel by a column number of the selected pixel, yielding a first multiplicand; and multiplying the range of longitude represented by each pixel by 0.5, yielding a second multiplicand; adding the first and second multiplicands to an origin longitude of the GUI map.

$$Lon_1+P_{col}((Lon_2-Lon_1)/N_{cols})+0.5((Lon_2-Lon_1)/N_{cols}) \quad (Exp.\ 3)$$

In Expression 3, the range of longitude represented by each pixel is given by $((Lon_2-Lon_1)/N_{cols})$, and the first multiplicand is $P_{col}((Lon_2-Lon_1)/N_{cols})$. The second multiplicand is given by $0.5((Lon_2-Lon_1)/N_{cols})$.

Similarly, locating a region on the surface of the Earth in dependence upon the boundaries, the ranges, and the location of the pixel on the GUI map, as illustrated by Expression 4, typically also includes multiplying the range of latitude represented by each pixel by a row number of the selected pixel, yielding a third multiplicand; multiplying the range of latitude represented by each pixel by 0.5, yielding a fourth multiplicand; and adding the third and fourth multiplicands to an origin latitude of the GUI map.

$$Lat_1+P_{row}((Lat_2-Lat_1)/N_{rows})+0.5((Lat_2-Lat_1)/N_{rows}) \quad (Exp.\ 4)$$

In Expression 4, the range of latitude represented by each pixel is given by $((Lat_2-Lat_1)/N_{rows})$, and the third multiplicand is $P_{row}((Lat_2-Lat_1)/N_{rows})$. The fourth multiplicand is given by $0.5((Lat_2-Lat_1)/N_{rows})$. Expressions 3 and 4 taken together map the location of pixel (412) to the center (510) of the located region (508).

Navigation on a Heading to a Waypoint

Figure 6:
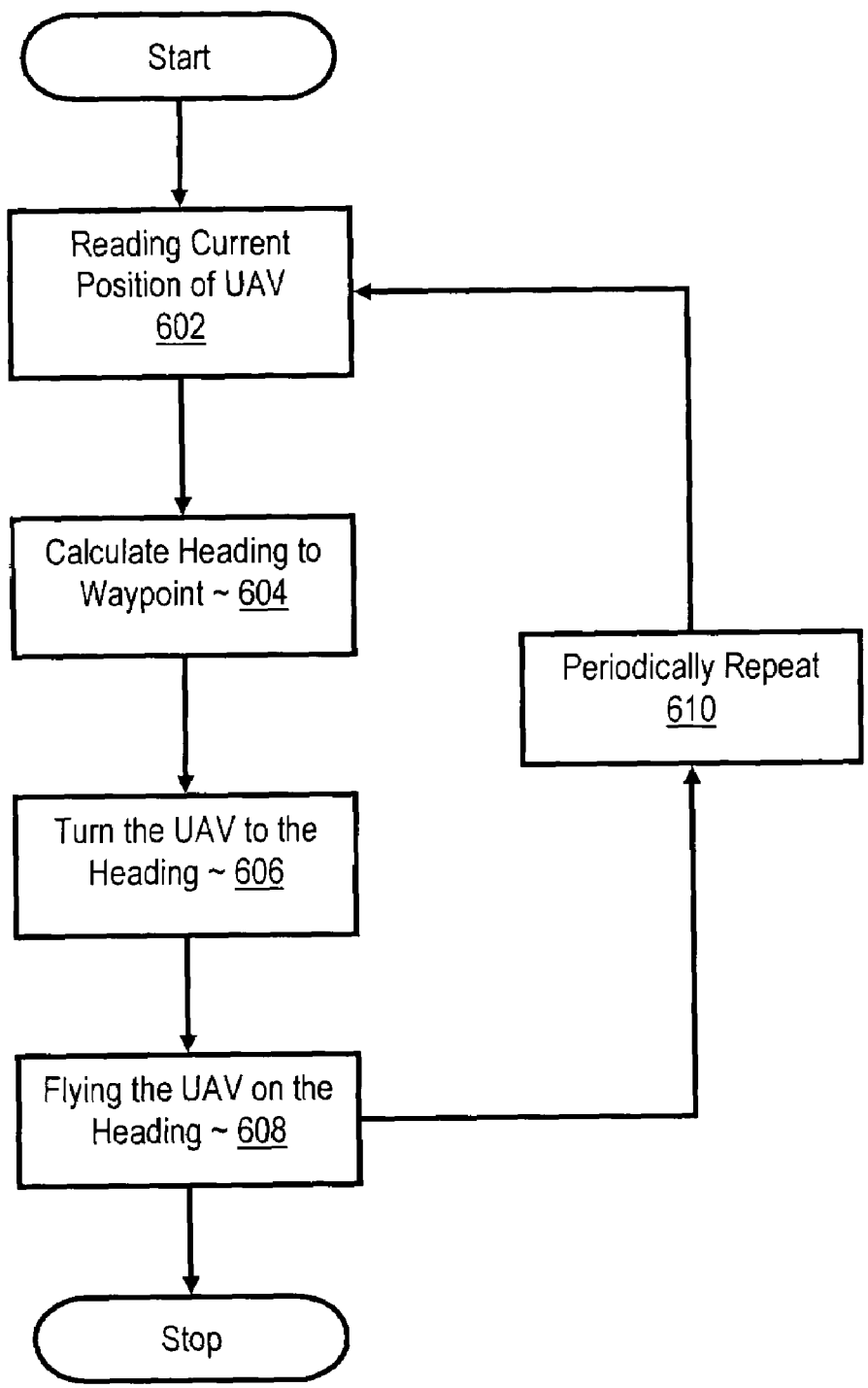
FIG. 6 sets forth a flow chart illustrating an exemplary method of piloting in accordance with a navigation algorithm.

An exemplary method of navigating in accordance with a navigation algorithm is explained with reference to FIGS. 6 and 7. FIG. 6 sets forth a flow chart illustrating an exemplary method of piloting in accordance with a navigation algorithm, and FIG. 7 sets forth a line drawing illustrating a flight path produced by application of the method of FIG. 6. The method of FIG. 6 includes periodically repeating (610) the steps of:

reading (602) from the GPS receiver a current position of the UAV;

calculating (604) a heading from the current position to the waypoint;

turning (606) the UAV to the heading; and flying (608) the UAV on the heading.

In this method, if $Lon_1$, $Lat_1$, is taken as the current position, and $Lon_2$, $Lat_2$ is taken as the waypoint position, then the heading may be calculated generally as the inverse tangent of $((Lat_2-Lat_1)/(Lon_2-Lon_1))$.

Figure 7:
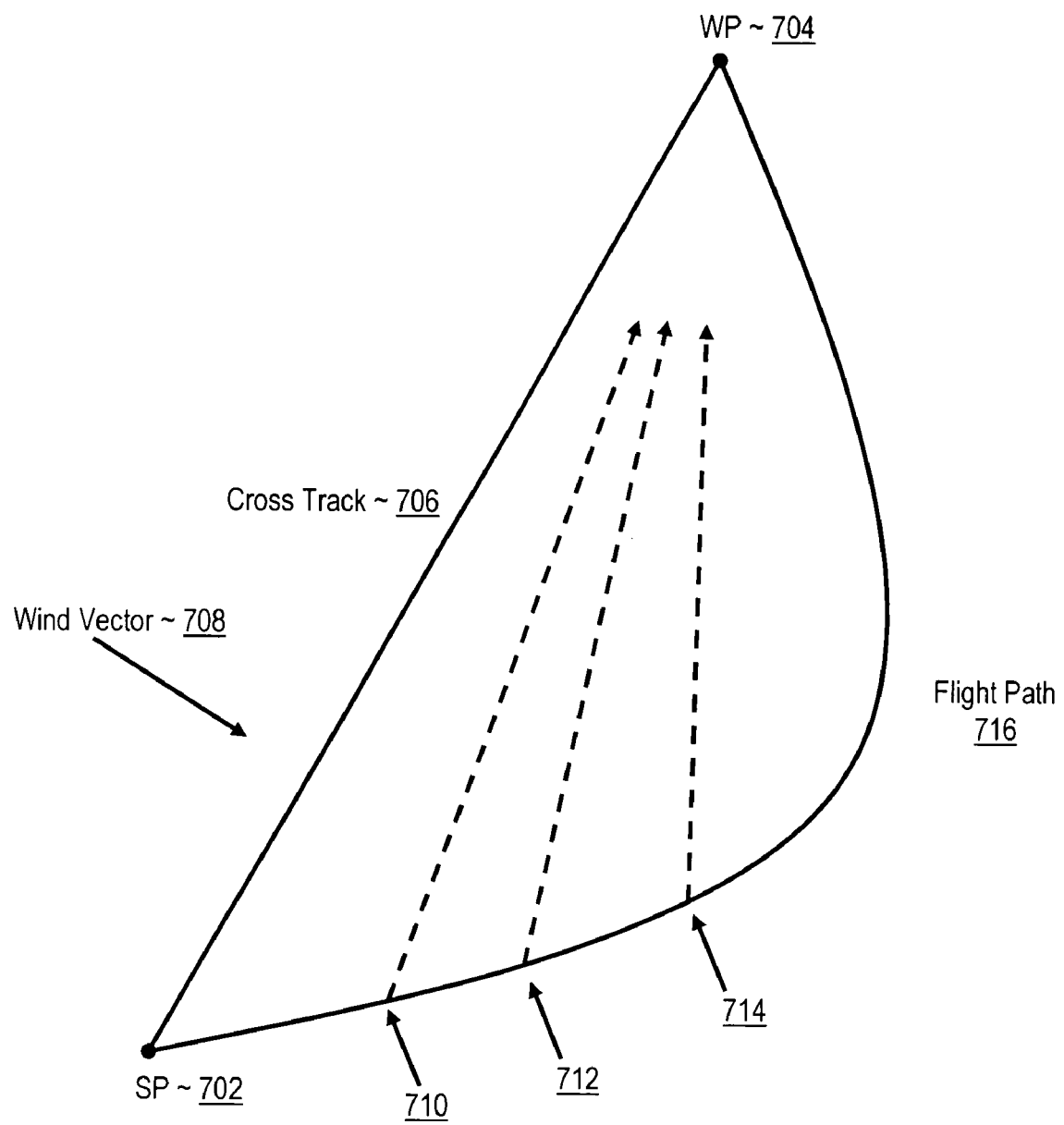
FIG. 7 sets forth a line drawing illustrating a flight path produced by application of the method of FIG. 6.

FIG. 7 shows the effect of the application of the method of FIG. 6. In the example of FIG. 7, a UAV is flying in a cross wind having cross wind vector (708). Curved flight path (716) results from periodic calculations according to the method of FIG. 6 of a new heading straight from a current location to the waypoint. FIG. 7 shows periodic repetitions of the method of FIG. 6 at plot points (710, 712, 714). For clarity of explanation, only three periodic repetitions are shown, although that is not a limitation of the invention. In fact, any number of periodic repetitions may be used as will occur to those of skill in the art.

Navigation with Headings Set to a Cross Track Direction

Figure 8:
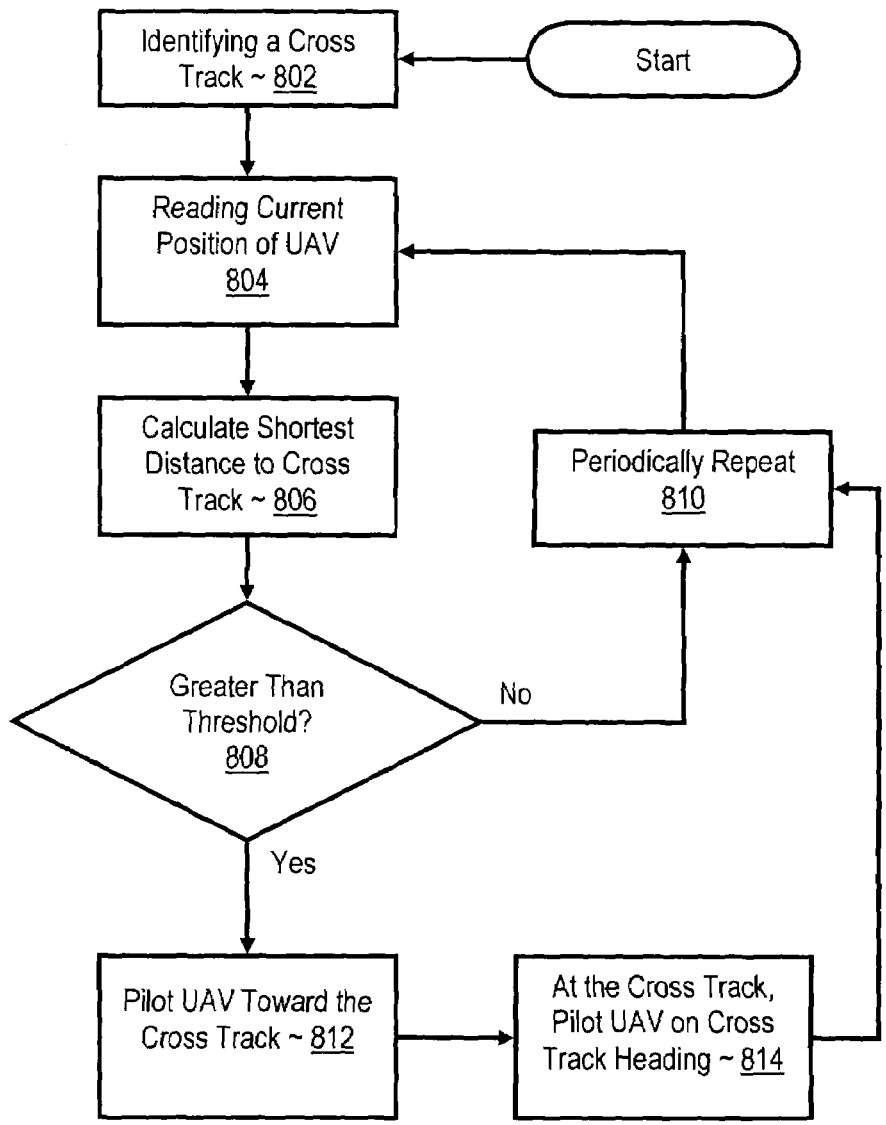
FIG. 8 sets forth a flow chart illustrating an exemplary method of piloting in accordance with a navigation algorithm.

A further exemplary method of navigating in accordance with a navigation algorithm is explained with reference to FIGS. 8 and 9. FIG. 8 sets forth a flow chart illustrating an exemplary method of piloting in accordance with a navigation algorithm, and FIG. 9 sets forth a line drawing illustrating a flight path produced by application of the method of FIG. 8.

The method of FIG. 8 includes identifying (802) a cross track between the starting point and the waypoint. A cross track is a fixed course from a starting point directly to a waypoint. If $Lon_1$, $Lat_1$, is taken as the position of a starting point, and $Lon_2$, $Lat_2$ is taken as the waypoint position, then a cross track is identified by $Lon_1$, $Lat_1$ and $Lon_2$, $Lat_2$. A cross track has a direction, a 'cross track direction,' that is the direction straight from a starting point to a waypoint, and it is often useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2-Lat_1)/(Lon_2-Lon_1))$.

The method of FIG. 8 includes periodically repeating (810) the steps of: reading (804) from the GPS receiver a current position of the UAV; calculating (806) a shortest distance between the current position and the cross track; and if the shortest distance between the current position and the cross track is greater than a threshold distance, piloting (812) the UAV toward the cross track, and, upon arriving at the cross track, piloting (814) the UAV in a cross track direction toward the waypoint. FIG. 9 illustrates calculating a shortest distance between the current position and a cross track. In the example of FIG. 9, calculating a shortest distance between the current position and a cross track includes calculating the distance from a current position (912) to the waypoint (704). In the example of FIG. 9, the distance from the current position (912) to the waypoint (704) is represented as the length of line (914). For current position $Lon_1$, $Lat_1$ and waypoint position $Lon_2$, $Lat_2$, the distance from a current position (912) to the waypoint (704) is given by the square root of $(Lat_2-Lat_1)^2+(Lon_2-Lon_1)^2$.

In this example, calculating a shortest distance between the current position and a cross track also includes calculating the angle (910) between a direction from the current position to the waypoint and a cross track direction. In the example of FIG. 9, the direction from the current position (912) to the waypoint (704) is represented as the direction of line (914). In the example of FIG. 9, the cross track direction is the direction of cross track (706). The angle between a direction from the current position to the waypoint and a cross track direction is the difference between those directions.

In the current example, calculating a shortest distance between the current position and a cross track also includes calculating the tangent of the angle between a direction from the current position to the waypoint and a cross track direction and multiplying the tangent of the angle by the distance from the current position to the waypoint.

Figure 9:
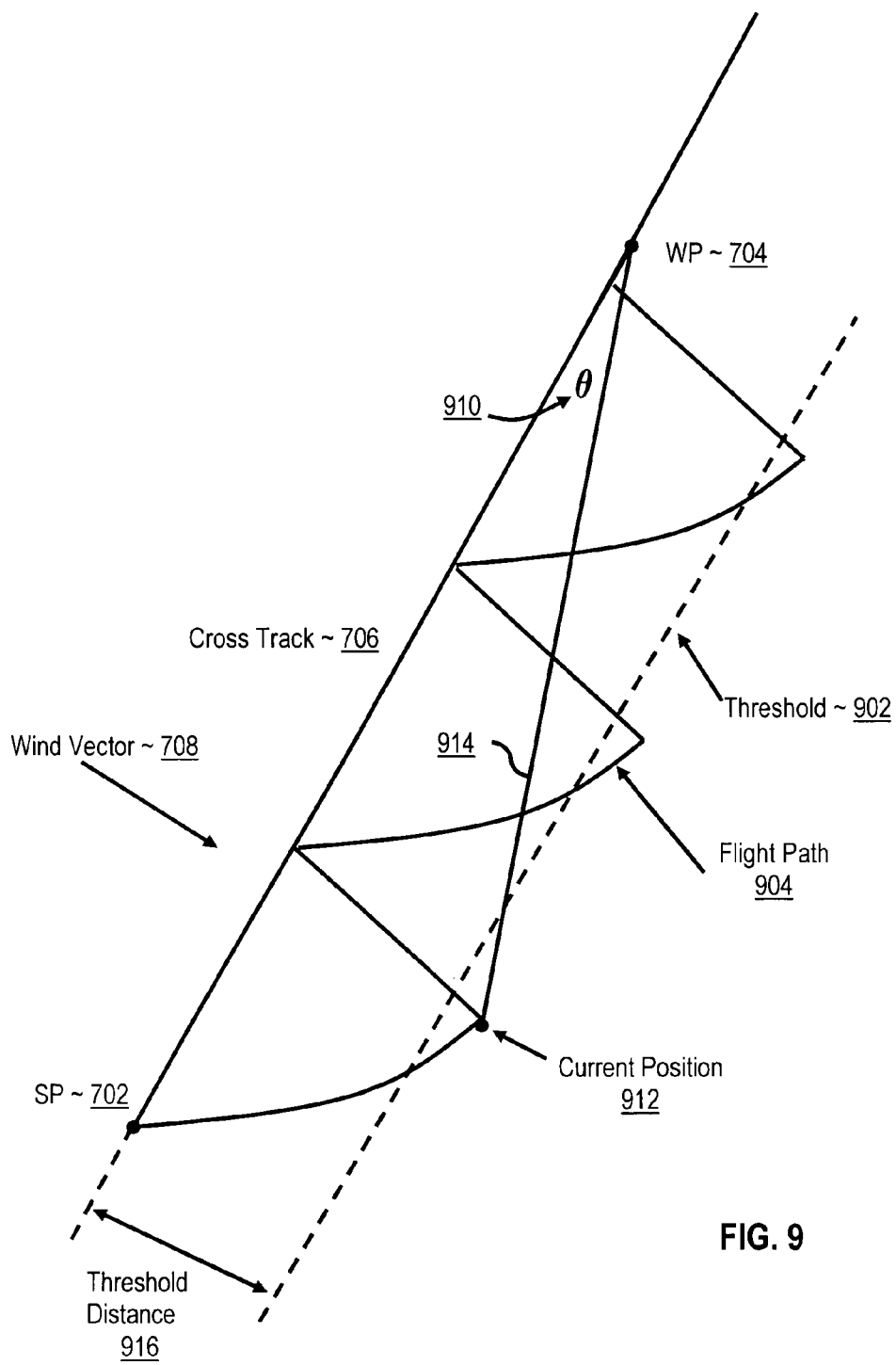
FIG. 9 sets forth a line drawing illustrating a flight path produced by application of the method of FIG. 8.

FIG. 9 also shows the effect of the application of the method of FIG. 8. In the example of FIG. 9, a UAV is flying in a cross wind having cross wind vector (708). Curved flight path (904) results from periodic calculations according to the method of FIG. 8 of a shortest distance between a current position and the cross track (706), flying the UAV back to the cross track and then in the direction of the cross track whenever the distance from the cross track exceeds a predetermined threshold distance.

Headings Set to Cross Track Direction with Angular Thresholds

Figure 10:
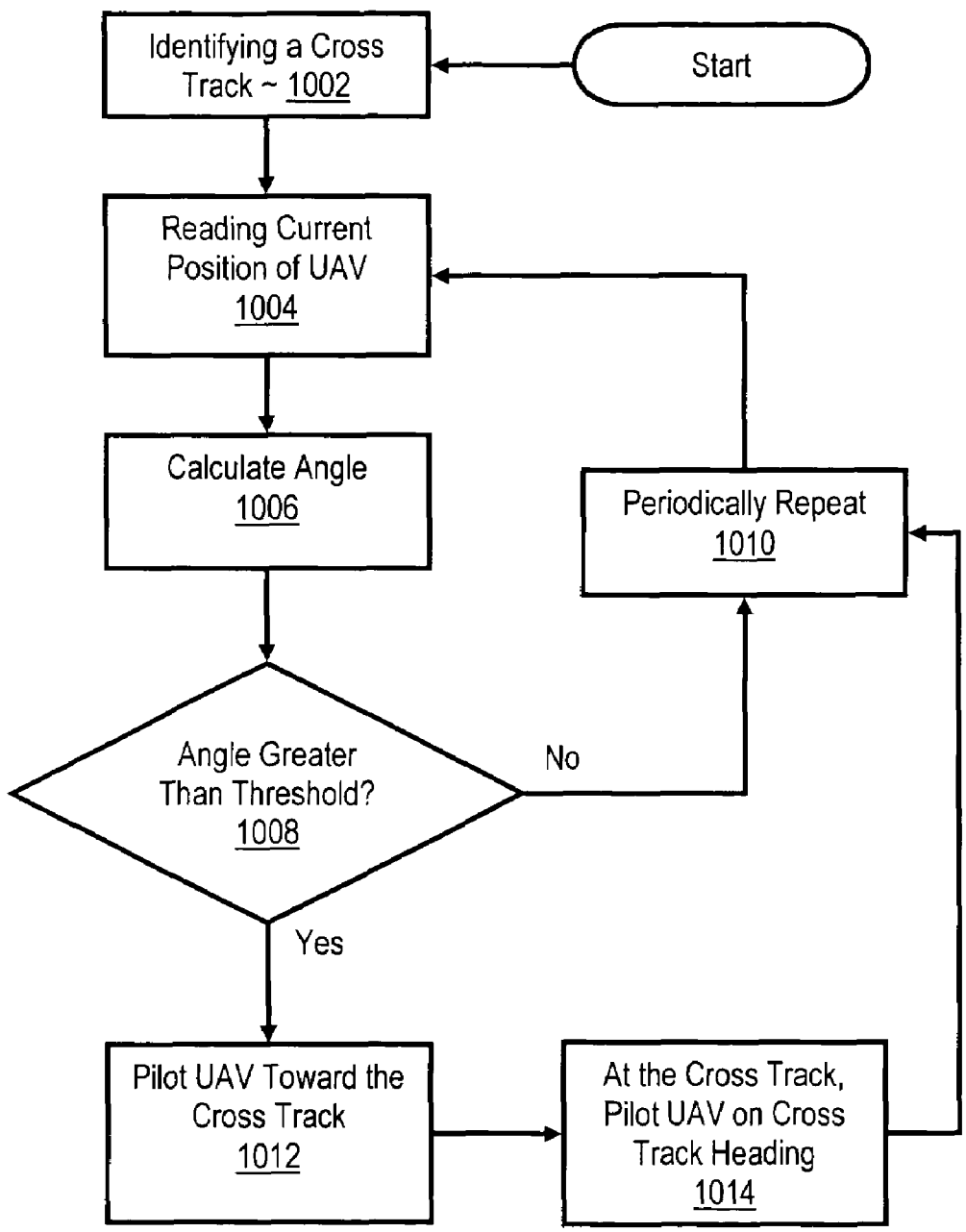
FIG. 10 sets forth a flow chart illustrating an exemplary method of piloting in accordance with a navigation algorithm.

A further exemplary method of navigating in accordance with a navigation algorithm is explained with reference to FIGS. 10 and 11. FIG. 10 sets forth a flow chart illustrating an exemplary method of piloting in accordance with a navigation algorithm, and FIG. 11 sets forth a line drawing illustrating a flight path produced by application of the method of FIG. 10.

In the method of FIG. 10, piloting in accordance with a navigation algorithm includes identifying (1002) a cross track having a cross track direction between the starting point and the waypoint. As described above, a cross track is identified by a position of a starting point and a waypoint position. For a starting point position of $Lon_1$, $Lat_1$ and a waypoint position of $Lon_2$, $Lat_2$, a cross track is identified by $Lon_1$, $Lat_1$ and $Lon_2$, $Lat_2$. In addition, it is often also useful to characterize a cross track by its cross track direction. The cross track direction for a cross track identified by starting point $Lon_1$, $Lat_1$ and waypoint position $Lon_2$, $Lat_2$ may be calculated generally as the inverse tangent of $((Lat_2-Lat_1)/(Lon_2-Lon_1))$.

In the method of FIG. 10, piloting in accordance with a navigation algorithm also includes repeatedly (1010) carrying out the steps of reading (1004) from the GPS receiver a current position of the UAV; calculating (1006) an angle between the direction from the current position to the waypoint and a cross track direction; and, if the angle is greater than a threshold angle, piloting (1012) the UAV toward the cross track, and, upon arriving at the cross track, piloting (1014) the UAV in the cross track direction. Piloting toward the cross track is carried out by turning to a heading no more than ninety degrees from the cross track direction, turning to the left if the current position is right of the cross track and to the right if the current position is left of the cross track. Piloting in the cross track direction means turning the UAV to the cross track direction and then flying straight and level on the cross track direction. That is, in piloting in the cross track direction, the cross track direction is set as the compass heading for the UAV.

Figure 11:
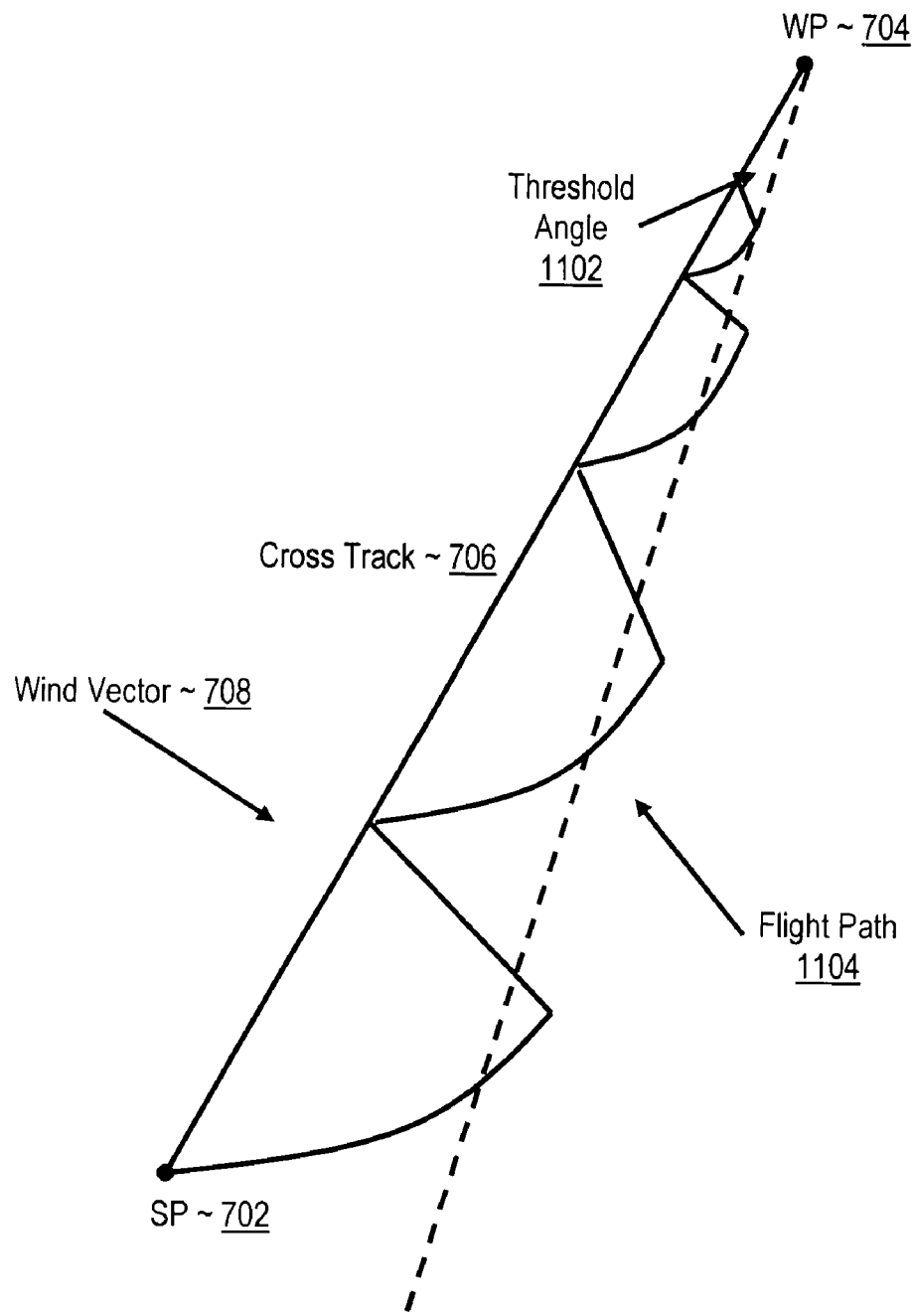
FIG. 11 sets forth a line drawing illustrating a flight path produced by application of the method of FIG. 10.

FIG. 11 shows the effect of the application of the method of FIG. 10. In the example of FIG. 11, a UAV is flying in a cross wind having cross wind vector (708). Curved flight path (1104) results from periodically flying the UAV, according to the method of FIG. 10, back to the cross track and then in the direction of the cross track whenever an angle between the direction from the current position to the waypoint and a cross track direction exceeds a predetermined threshold angle.

In many embodiments of the method of FIG. 10, the threshold angle is a variable whose value varies in dependence upon a distance between the UAV and the waypoint. In typical embodiments that vary the threshold angle, the threshold angle is increased as the UAV flies closer to the waypoint. It is useful to increase the threshold angle as the UAV flies closer to the waypoint to reduce the risk of excessive 'hunting' on the part of the UAV. That is, because the heading is the cross track direction, straight to the WP rather than cross-wind, if the angle remains the same, the distance that the UAV needs to be blown off course to trigger a return to the cross track gets smaller and smaller until the UAV is flying to the cross track, turning to the cross track direction, getting blown immediately across the threshold, flying back the cross track, turning to the cross track direction, getting blown immediately across the threshold, and so on, and so on, in rapid repetition. Increasing the threshold angle as the UAV flies closer to the waypoint increases the lateral distance available for wind error before triggering a return to the cross track, thereby reducing this risk of excessive hunting.

Navigation on a Course to a Waypoint

Figure 12:
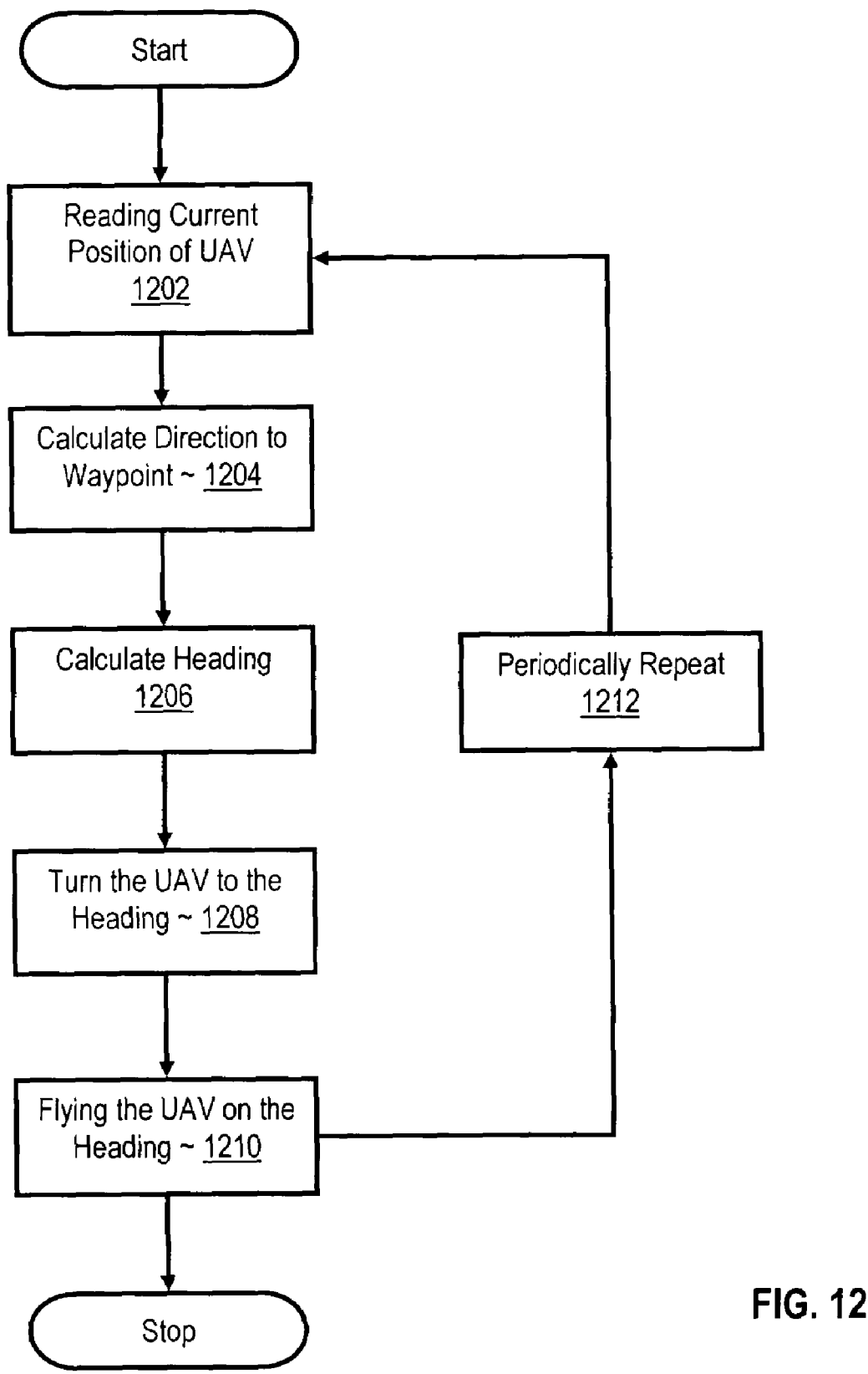
FIG. 12 sets forth a flow chart illustrating an exemplary method of piloting in accordance with a navigation algorithm.
Figure 12A:
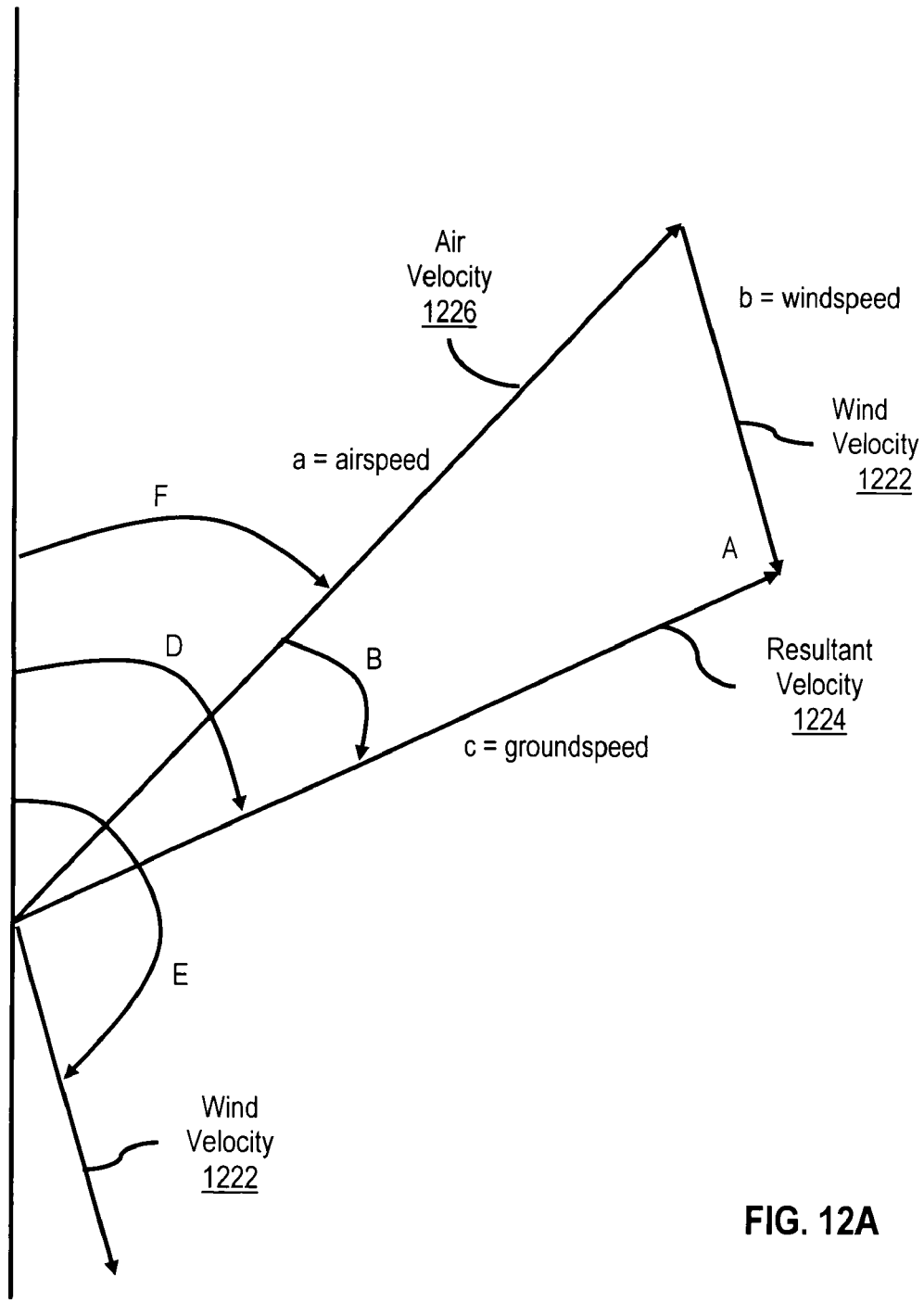
FIG. 12A sets forth a line drawing illustrating a method of calculating a heading with a cross wind to achieve a particular ground course.

A further exemplary method of navigating in accordance with a navigation algorithm is explained with reference to FIGS. 12, 12A, and 13. FIG. 12 sets forth a flow chart illustrating an exemplary method of piloting in accordance with a navigation algorithm. FIG. 12A sets forth a line drawing illustrating a method of calculating a heading with a cross wind to achieve a particular ground course. And FIG. 13 sets forth a line drawing illustrating a flight path produced by application of the method of FIG. 12.

In the method of FIG. 12, piloting in accordance with a navigation algorithm comprises periodically repeating (1212) the steps of reading (1202) from the GPS receiver a current position of the UAV; calculating (1204) a direction to the waypoint from the current position; calculating (1206) a heading in dependence upon wind speed, wind direction, air speed, and the direction to the waypoint; turning (1208) the UAV to the heading; and flying (1210) the UAV on the heading.

FIG. 12A illustrates calculating (1206) a heading in dependence upon wind speed, wind direction, air speed, and the direction to the waypoint. FIG. 12A sets forth a line drawing illustrating relations among several pertinent vectors, a wind velocity (1222), a resultant velocity (1224), and a UAV's air velocity (1226). A velocity vector includes a speed and a direction. These vectors taken together represent wind speed, wind direction, air speed, and the direction to the waypoint. In the example of FIG. 12A, the angle B is a so-called wind correction angle, an angle which subtracted from (or added to, depending on wind direction) a direction to a waypoint yields a heading, a compass heading for a UAV to fly so that is resultant ground course is on a cross track. A UAV traveling at an air speed of 'a' on heading (D–B) in the presence of a wind speed 'b' with wind direction E will have resultant ground speed 'c' in direction D.

In FIG. 12A, angle A represents the difference between the wind direction E and the direction to the waypoint D. In FIG. 12A, the wind velocity vector (1222) is presented twice, once to show the wind direction as angle E and again to illustrate angle A as the difference between angles E and D. Drawing wind velocity (1222) to form angle A with the resultant velocity (1224) also helps explain how to calculate wind correction angle B using the law of sines. Knowing two sides of a triangle and the angle opposite one of them, the angle opposite the other may be calculated, in this example, by $B=\sin^{-1}(b(\sin A)/a)$. The two known sides are airspeed 'a' and wind speed 'b.' The known angle is A, the angle opposite side 'a,' representing the difference between wind direction E and direction to the waypoint D. Calculating a heading, angle F on FIG. 12A, is then carried out by subtracting the wind correction angle B from the direction to the waypoint D.

Figure 13:
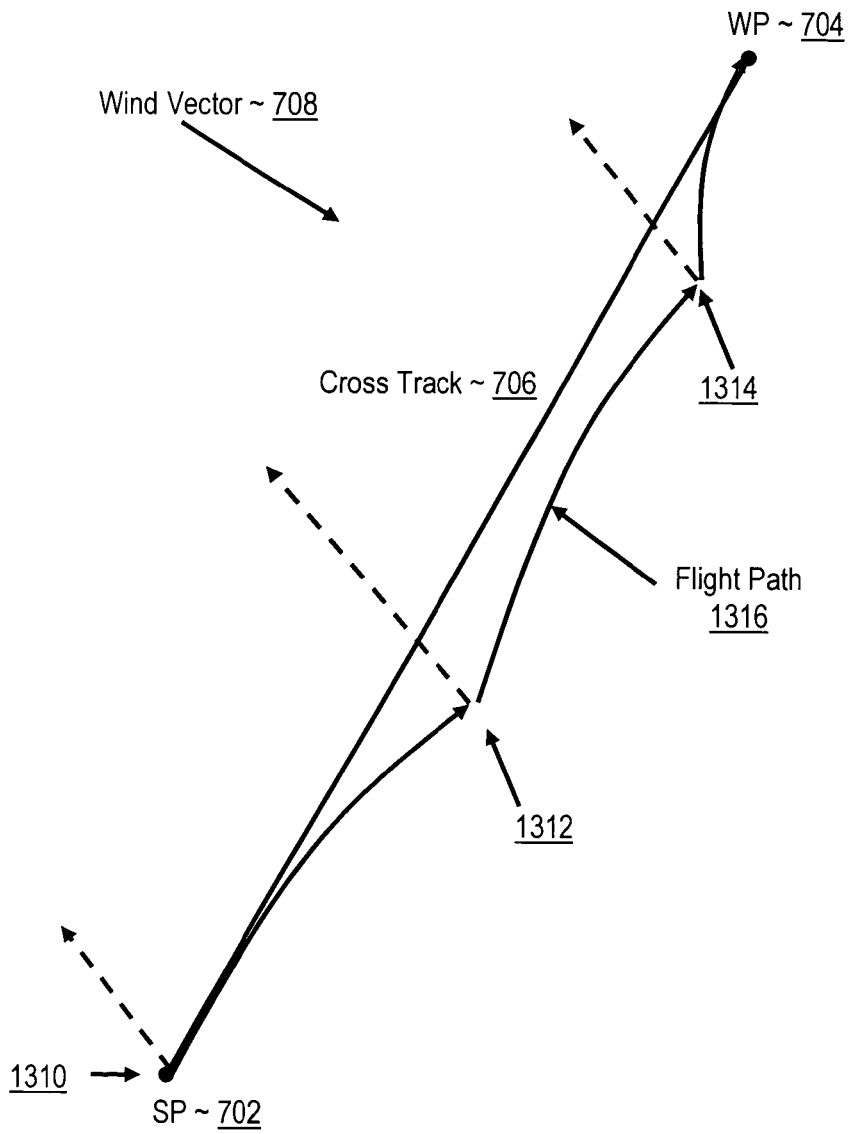
FIG. 13 sets forth a line drawing illustrating a flight path produced by application of the method of FIG. 12.

FIG. 13 shows the effect of the application of the method of FIG. 12. In the example of FIG. 13, a UAV is flying in a cross wind having cross wind vector (708). Curved flight path (1316) results from periodic calculations according to the method of FIG. 12 of a new heading straight whose resultant with a wind vector is a course straight from a current location to the waypoint. FIG. 13 shows periodic repetitions of the method of FIG. 12 at plot points (1310, 1312, 1314). For clarity of explanation, only three periodic repetitions are shown, although that is not a limitation of the invention. In fact, any number of periodic repetitions may be used as will occur to those of skill in the art.

Navigation on a Course Set to a Cross Track Direction

Figure 14:
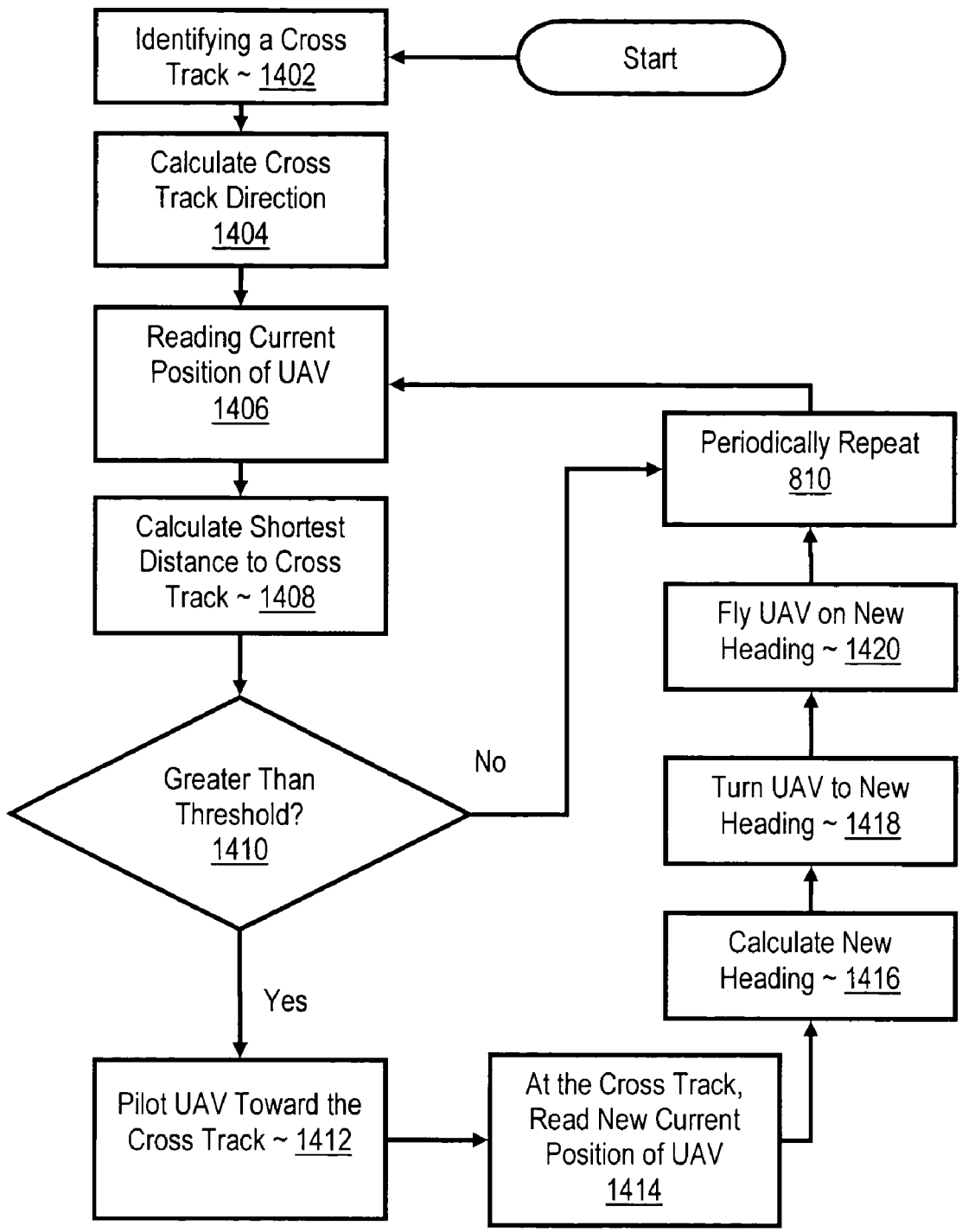
FIG. 14 sets forth a flow chart illustrating an exemplary method of piloting in accordance with a navigation algorithm.

A further exemplary method of navigating in accordance with a navigation algorithm is explained with reference to FIGS. 14 and 15. FIG. 14 sets forth a flow chart illustrating an exemplary method of piloting in accordance with a navigation algorithm, and FIG. 15 sets forth a line drawing illustrating a flight path produced by application of the method of FIG. 14.

The method of FIG. 14 includes identifying (1402) a cross track and calculating (1404) a cross track direction from the starting position to the waypoint. In the method of FIG. 14, piloting in accordance with a navigation algorithm is carried out by periodically repeating the steps of reading (1406) from the GPS receiver a current position of the UAV; calculating (1408) a shortest distance between the cross track and the current position; and, if the shortest distance between the cross track and the current position is greater than a threshold distance, piloting (1412) the UAV to the cross track. Upon arriving at the cross track, the method includes: reading (1414) from the GPS receiver a new current position of the UAV; calculating (1416), in dependence upon wind speed, wind direction, air speed, and the cross track direction, a new heading; turning (1418) the UAV to the new heading; and flying (1420) the UAV on the new heading.

Figure 15:
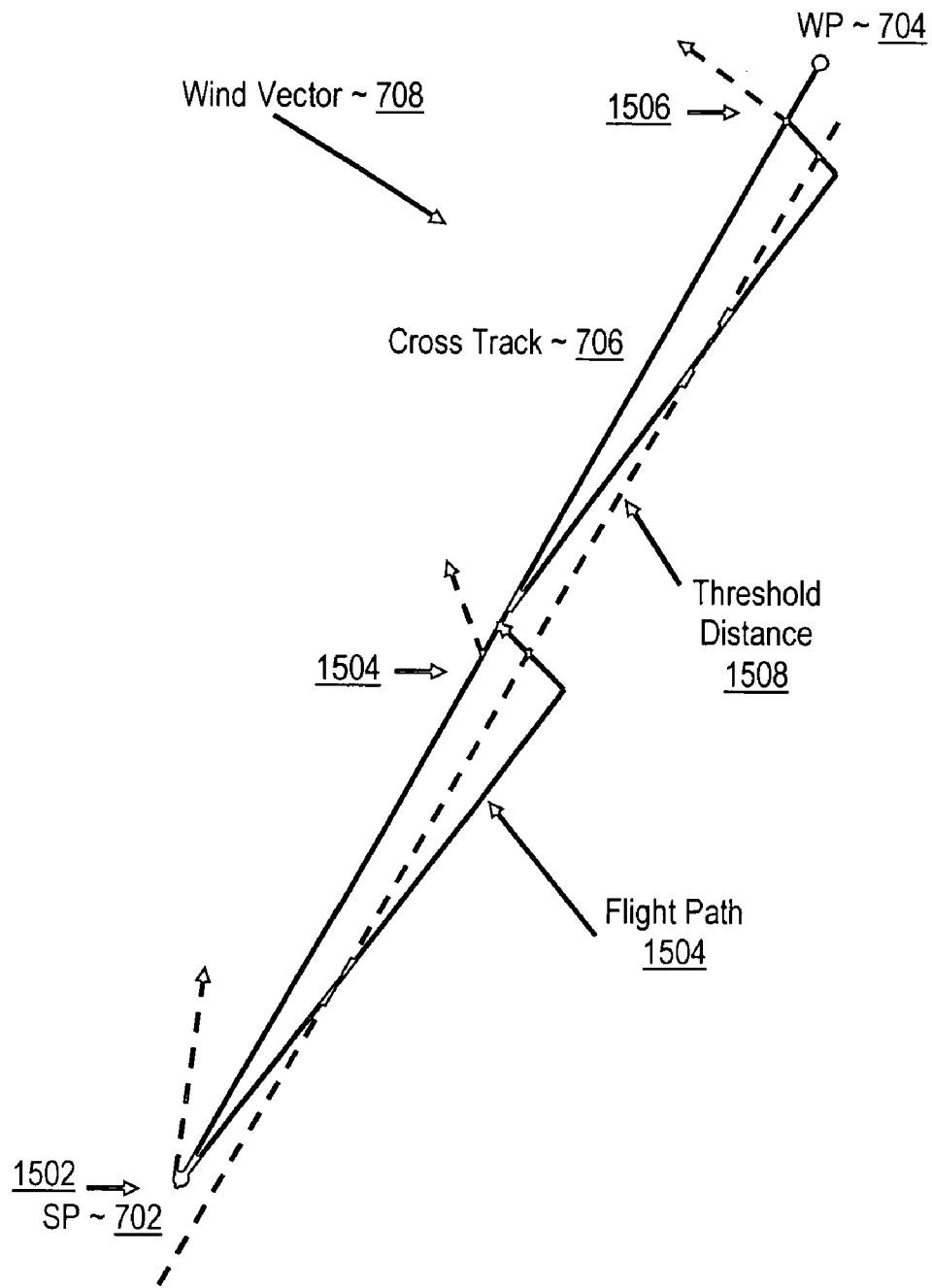
FIG. 15 sets forth a line drawing illustrating a flight path produced by application of the method of FIG. 14.

FIG. 15 shows the effect of the application of the method of FIG. 14. In the example of FIG. 15, a UAV is flying in a cross wind having cross wind vector (708). Curved flight path (1304) results from periodic calculations according to the method of FIG. 14 of a shortest distance between a current position and the cross track (706), flying the UAV back to the cross track, and, upon arriving at the cross track, calculating a new heading and flying the UAV on the new heading.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for navigating a UAV, the method comprising:
    receiving in a remote control device a user's selection of a GUI map pixel that represents a waypoint for UAV navigation, the pixel having a location on the GUI;
    mapping the pixel's location on the GUI to Earth coordinates of the waypoint;
    transmitting the coordinates of the waypoint to the UAV;
    reading a starting position from a GPS receiver on the UAV;
    piloting the UAV, under control of a navigation computer on the UAV, from the starting position to the waypoint in accordance with a navigation algorithm; and
    while piloting the UAV from the starting position to the waypoint:

reading from the GPS receiver a sequence of GPS data representing a flight path of the UAV; and depicting the flight of the UAV with 3D computer graphics, including a computer graphic display of a satellite image of the Earth, in dependence upon the GPS data.

2. The method of claim 1 wherein depicting the flight of the UAV further comprises:

determining, on the UAV, a display attitude of the UAV in dependence upon the sequence of GPS data;

calculating, on the UAV, from the sequence of GPS data, the UAV's course;

creating, on the UAV, images for display in dependence upon the display attitude, the course, and a satellite image stored on the UAV; and downloading the images for display from the UAV to the remote control device.

3. The method of claim 1 wherein depicting the flight of the UAV further comprises:

downloading the GPS sequence from the UAV to the remote control device;

determining, in the remote control device, a display attitude of the UAV in dependence upon the sequence of GPS data;

calculating, in the remote control device, from the sequence of GPS data, the UAV's course; and creating, in the remote control device, images for display in dependence upon the display attitude, the course, and a satellite image stored on the remote control device.

4. The method of claim 1 wherein depicting the flight of the UAV further comprises determining a display attitude of the UAV in dependence upon the sequence of GPS data, including:

detecting changes in the UAV's course from the sequence of GPS data;

determining a display roll angle in dependence upon the detected course changes.

5. The method of claim 1 wherein depicting the flight of the UAV further comprises determining a display attitude of the UAV in dependence upon the sequence of GPS data, including:

detecting changes in the UAV's course from the sequence of GPS data;

determining a display yaw angle in dependence upon the detected course changes.

6. The method of claim 1 wherein depicting the flight of the UAV further comprises determining a display attitude of the UAV in dependence upon the sequence of GPS data, including:

detecting changes in the UAV's altitude from the sequence of GPS data;

determining a display pitch angle in dependence upon the detected altitude changes.

7. The method of claim 1 further comprising:

receiving user selections of a multiplicity of GUI map pixels representing waypoints, each pixel having a location on the GUI mapping each pixel location to Earth coordinates of a waypoint;

assigning one or more UAV instructions to each waypoint;

transmitting the coordinates of the waypoints and the UAV instructions to the UAV;

storing the coordinates of the waypoints and the UAV instructions in computer memory on the UAV;

piloting the UAV to each waypoint in accordance with one or more navigation algorithms; and operating the UAV at each waypoint in accordance with the UAV instructions for each waypoint.

8. The method of claim 1 wherein mapping the pixel's location on the GUI to Earth coordinates of the waypoint further comprises:

mapping pixel boundaries of the GUI map to Earth coordinates;

identifying a range of latitude and a range of longitude represented by each pixel; and locating a region on the surface of the Earth in dependence upon the boundaries, the ranges, and the location of the pixel on the GUI map.

9. The method of claim 8 wherein locating a region on the surface of the Earth in dependence upon the boundaries, the ranges, and the location of the pixel on the GUI map further comprises:

multiplying the range of longitude represented by each pixel by a column number of the selected pixel, yielding a first multiplicand;

multiplying the range of longitude represented by each pixel by 0.5, yielding a second multiplicand;

adding the first and second multiplicands to an origin longitude of the GUI map;

multiplying the range of latitude represented by each pixel by a row number of the selected pixel, yielding a third multiplicand;

multiplying the range of latitude represented by each pixel by 0.5, yielding a fourth multiplicand; and adding the third and fourth multiplicands to an origin latitude of the GUI map.

10. A system for navigating a UAV, the system comprising:

means for receiving in a remote control device a user's selection of a GUI map pixel that represents a waypoint for UAV navigation, the pixel having a location on the GUI;

means for mapping the pixel's location on the GUI to Earth coordinates of the waypoint;

means for transmitting the coordinates of the waypoint to the UAV;

means for reading a starting position from a GPS receiver on the UAV;

means for piloting the UAV, under control of a navigation computer on the UAV, from the starting position to the waypoint in accordance with a navigation algorithm; and while piloting the UAV from the starting position to the waypoint:

means for reading from the GPS receiver a sequence of GPS data representing a flight path of the UAV; and means for depicting the flight of the UAV with 3D computer graphics, including a computer graphic display of a satellite image of the Earth, in dependence upon the GPS data.

11. The system of claim 10 wherein means for depicting the flight of the UAV further comprises:

means for determining, on the UAV, a display attitude of the UAV in dependence upon the sequence of GPS data;

means for calculating, on the UAV, from the sequence of GPS data, the UAV's course;

means for creating, on the UAV, images for display in dependence upon the display attitude, the course, and a satellite image stored on the UAV; and means for downloading the images for display from the UAV to the remote control device.

12. The system of claim 10 wherein means for depicting the flight of the UAV further comprises:
  means for downloading the GPS sequence from the UAV to the remote control device;
  means for determining, in the remote control device, a display attitude of the UAV in dependence upon the sequence of GPS data;
  means for calculating, in the remote control device, from the sequence of GPS data, the UAV's course; and
  means for creating, in the remote control device, images for display in dependence upon the display attitude, the course, and a satellite image stored on the remote control device.

13. The system of claim 10 wherein means for depicting the flight of the UAV further comprises means for determining a display attitude of the UAV in dependence upon the sequence of GPS data, including:
  means for detecting changes in the UAV's course from the sequence of GPS data;
  means for determining a display roll angle in dependence upon the detected course changes.

14. The system of claim 10 wherein means for depicting the flight of the UAV further comprises means for determining a display attitude of the UAV in dependence upon the sequence of GPS data, including:
  means for detecting changes in the UAV's course from the sequence of GPS data;
  means for determining a display yaw angle in dependence upon the detected course changes.

15. The system of claim 10 wherein means for depicting the flight of the UAV further comprises means for determining a display attitude of the UAV in dependence upon the sequence of GPS data, including:
  means for detecting changes in the UAV's altitude from the sequence of GPS data;
  means for determining a display pitch angle in dependence upon the detected altitude changes.

16. The system of claim 10 further comprising:
  means for receiving user selections of a multiplicity of GUI map pixels representing waypoints, each pixel having a location on the GUI
  means for mapping each pixel location to Earth coordinates of a waypoint;
  means for assigning one or more UAV instructions to each waypoint;
  means for transmitting the coordinates of the waypoints and the UAV instructions to the UAV;
  means for storing the coordinates of the waypoints and the UAV instructions in computer memory on the UAV;
  means for piloting the UAV to each waypoint in accordance with one or more navigation algorithms; and
  means for operating the UAV at each waypoint in accordance with the UAV instructions for each waypoint.

17. The system of claim 10 wherein means for mapping the pixel's location on the GUI to Earth coordinates of the waypoint further comprises:
  means for mapping pixel boundaries of the GUI map to Earth coordinates;
  means for identifying a range of latitude and a range of longitude represented by each pixel; and
  means for locating a region on the surface of the Earth in dependence upon the boundaries, the ranges, and the location of the pixel on the GUI map.

18. The system of claim 17 wherein means for locating a region on the surface of the Earth in dependence upon the boundaries, the ranges, and the location of the pixel on the GUI map further comprises:
  means for multiplying the range of longitude represented by each pixel by a column number of the selected pixel, yielding a first multiplicand;
  means for multiplying the range of longitude represented by each pixel by 0.5, yielding a second multiplicand;
  means for adding the first and second multiplicands to an origin longitude of the GUI map;
  means for multiplying the range of latitude represented by each pixel by a row number of the selected pixel, yielding a third multiplicand;
  means for multiplying the range of latitude represented by each pixel by 0.5, yielding a fourth multiplicand; and
  means for adding the third and fourth multiplicands to an origin latitude of the GUI map.

19. A computer program product for navigating a UAV, the computer program product comprising:
  a recording medium;
  means, recorded on the recording medium, for receiving in a remote control device a user's selection of a GUI map pixel that represents a waypoint for UAV navigation, the pixel having a location on the GUI;
  means, recorded on the recording medium, for mapping the pixel's location on the GUI to Earth coordinates of the waypoint;
  means, recorded on the recording medium, for transmitting the coordinates of the waypoint to the UAV;
  means, recorded on the recording medium, for reading a starting position from a GPS receiver on the UAV;
  means, recorded on the recording medium, for piloting the UAV, under control of a navigation computer on the UAV, from the starting position to the waypoint in accordance with a navigation algorithm; and
  while piloting the UAV from the starting position to the waypoint:
    means, recorded on the recording medium, for reading from the GPS receiver a sequence of GPS data representing a flight path of the UAV; and
    means, recorded on the recording medium, for depicting the flight of the UAV with 3D computer graphics, including a computer graphic display of a satellite image of the Earth, in dependence upon the GPS data.

20. The computer program product of claim 19 wherein means, recorded on the recording medium, for depicting the flight of the UAV further comprises:
  means, recorded on the recording medium, for determining, on the UAV, a display attitude of the UAV in dependence upon the sequence of GPS data;
  means, recorded on the recording medium, for calculating, on the UAV, from the sequence of GPS data, the UAV's course;
  means, recorded on the recording medium, for creating, on the UAV, images for display in dependence upon the display attitude, the course, and a satellite image stored on the UAV; and
  means, recorded on the recording medium, for downloading the images for display from the UAV to the remote control device.

21. The computer program product of claim 19 wherein means, recorded on the recording medium, for depicting the flight of the UAV further comprises:
  means, recorded on the recording medium, for downloading the GPS sequence from the UAV to the remote control device;

means, recorded on the recording medium, for determining, in the remote control device, a display attitude of the UAV in dependence upon the sequence of GPS data;

means, recorded on the recording medium, for calculating, in the remote control device, from the sequence of GPS data, the UAV's course; and means, recorded on the recording medium, for creating, in the remote control device, images for display in dependence upon the display attitude, the course, and a satellite image stored on the remote control device.

22. The computer program product of claim 19 wherein means, recorded on the recording medium, for depicting the flight of the UAV further comprises means, recorded on the recording medium, for determining a display attitude of the UAV in dependence upon the sequence of GPS data, including:

means, recorded on the recording medium, for detecting changes in the UAV's course from the sequence of GPS data;

means, recorded on the recording medium, for determining a display roll angle in dependence upon the detected course changes.

23. The computer program product of claim 19 wherein means, recorded on the recording medium, for depicting the flight of the UAV further comprises means, recorded on the recording medium, for determining a display attitude of the UAV in dependence upon the sequence of GPS data, including:

means, recorded on the recording medium, for detecting changes in the UAV's course from the sequence of GPS data;

means, recorded on the recording medium, for determining a display yaw angle in dependence upon the detected course changes.

24. The computer program product of claim 19 wherein means, recorded on the recording medium, for depicting the flight of the UAV further comprises means, recorded on the recording medium, for determining a display attitude of the UAV in dependence upon the sequence of GPS data, including:

means, recorded on the recording medium, for detecting changes in the UAV's altitude from the sequence of GPS data;

means, recorded on the recording medium, for determining a display pitch angle in dependence upon the detected altitude changes.

25. The computer program product of claim 19 further comprising:

means, recorded on the recording medium, for receiving user selections of a multiplicity of GUI map pixels representing waypoints, each pixel having a location on the GUI means, recorded on the recording medium, for mapping each pixel location to Earth coordinates of a waypoint;

means, recorded on the recording medium, for assigning one or more UAV instructions to each waypoint;

means, recorded on the recording medium, for transmitting the coordinates of the waypoints and the UAV instructions to the UAV;

means, recorded on the recording medium, for storing the coordinates of the waypoints and the UAV instructions in computer memory on the UAV;

means, recorded on the recording medium, for piloting the UAV to each waypoint in accordance with one or more navigation algorithms; and means, recorded on the recording medium, for operating the UAV at each waypoint in accordance with the UAV instructions for each waypoint.

26. The computer program product of claim 19 wherein means, recorded on the recording medium, for mapping the pixel's location on the GUI to Earth coordinates of the waypoint further comprises:

means, recorded on the recording medium, for mapping pixel boundaries of the GUI map to Earth coordinates;

means, recorded on the recording medium, for identifying a range of latitude and a range of longitude represented by each pixel; and means, recorded on the recording medium, for locating a region on the surface of the Earth in dependence upon the boundaries, the ranges, and the location of the pixel on the GUI map.

27. The computer program product of claim 26 wherein means, recorded on the recording medium, for locating a region on the surface of the Earth in dependence upon the boundaries, the ranges, and the location of the pixel on the GUI map further comprises:

means, recorded on the recording medium, for multiplying the range of longitude represented by each pixel by a column number of the selected pixel, yielding a first multiplicand;

means, recorded on the recording medium, for multiplying the range of longitude represented by each pixel by 0.5, yielding a second multiplicand;

means, recorded on the recording medium, for adding the first and second multiplicands to an origin longitude of the GUI map;

means, recorded on the recording medium, for multiplying the range of latitude represented by each pixel by a row number of the selected pixel, yielding a third multiplicand;

means, recorded on the recording medium, for multiplying the range of latitude represented by each pixel by 0.5, yielding a fourth multiplicand; and means, recorded on the recording medium, for adding the third and fourth multiplicands to an origin latitude of the GUI map.

* * * * *